(12) United States Patent
Weitz

(10) Patent No.: US 11,872,506 B2
(45) Date of Patent: Jan. 16, 2024

(54) WATER FILTER CARTRIDGE HAVING AN AIR VENT

(71) Applicant: PARAGON WATER SYSTEMS, INC., Tampa, FL (US)

(72) Inventor: Ryan D. Weitz, Palm Harbor, FL (US)

(73) Assignee: PARAGON WATER SYSTEMS, INC., Tampa, FL (US)

( * ) Notice: Subject to any disclaimer, the term of this patent is extended or adjusted under 35 U.S.C. 154(b) by 1025 days.

(21) Appl. No.: 16/029,562

(22) Filed: Jul. 7, 2018

(65) Prior Publication Data

US 2020/0009482 A1 Jan. 9, 2020

(51) Int. Cl.
| | | |
|---|---|---|
| *B01D 24/12* | (2006.01) | |
| *B01D 24/38* | (2006.01) | |
| *C02F 1/00* | (2023.01) | |
| *C02F 1/28* | (2023.01) | |
| *C02F 1/42* | (2023.01) | |
| *B01D 35/30* | (2006.01) | |
| *B01D 27/08* | (2006.01) | |

(52) U.S. Cl.
CPC .............. *B01D 24/12* (2013.01); *B01D 24/38* (2013.01); *C02F 1/003* (2013.01); *B01D 27/08* (2013.01); *B01D 35/30* (2013.01); *B01D 2201/0415* (2013.01); *B01D 2201/29* (2013.01); *B01D 2201/301* (2013.01); *C02F 1/283* (2013.01); *C02F 1/42* (2013.01); *C02F 2201/004* (2013.01); *C02F 2201/006* (2013.01); *C02F 2307/04* (2013.01)

(58) Field of Classification Search
CPC ........ B01D 24/12; B01D 24/38; B01D 27/08; B01D 35/30; B01D 2201/29; B01D 2201/0415; B01D 2201/301; C02F 1/003; C02F 2201/004; C02F 2307/04; C02F 1/283; C02F 1/42; C02F 2201/006
See application file for complete search history.

(56) References Cited

U.S. PATENT DOCUMENTS

| | | | | |
|---|---|---|---|---|
| 6,739 | A * | 8/1831 | Barron ........................ | 210/351 |
| 103,592 | A * | 5/1870 | Farson .................... | C02F 1/001 |
| | | | | 210/476 |
| 231,480 | A * | 8/1880 | Downes ................. | B01D 21/02 |
| | | | | 210/166 |
| 316,885 | A * | 4/1885 | Dumont ................... | C02F 1/42 |
| | | | | 210/337 |
| 419,023 | A * | 1/1890 | Roberts ................ | B01D 24/183 |
| | | | | 210/313 |
| 466,809 | A * | 1/1892 | Stone ...................... | C02F 1/283 |
| | | | | 210/474 |
| 498,967 | A * | 6/1893 | Benham .................. | C02F 1/003 |
| | | | | 210/337 |
| 513,802 | A * | 1/1894 | Luscombe ............. | C02F 1/001 |
| | | | | 210/476 |
| 590,293 | A * | 9/1897 | Allen et al. ............ | C02F 1/003 |
| | | | | 210/477 |

(Continued)

*Primary Examiner* — Robert J Popovics
(74) *Attorney, Agent, or Firm* — Greer, Burns & Crain, Ltd

(57) ABSTRACT

A water filter system including a filter cartridge removably secured in a container. The filter cartridge includes a handle extending from the filter cartridge, where the handle includes at least one vent hole, so that air within the filter housing moves outwardly through the at least vent hole during filtration.

7 Claims, 9 Drawing Sheets

(56) References Cited

U.S. PATENT DOCUMENTS

| | | | | |
|---|---|---|---|---|
| 630,846 A * | 8/1899 | Bliss | B01D 29/0043 | 210/462 |
| 651,948 A * | 6/1900 | Lawson | C02F 1/283 | 210/503 |
| 773,946 A * | 11/1904 | Langill | C02F 1/003 | 210/284 |
| 903,070 A * | 11/1908 | Farnell | C02F 1/003 | 210/290 |
| 967,905 A * | 8/1910 | Hagg | B01D 17/045 | 210/301 |
| 1,052,440 A * | 2/1913 | Hagg | B01D 37/025 | 210/474 |
| 1,157,776 A * | 10/1915 | Hagg | C02F 1/003 | 210/474 |
| 1,208,882 A * | 12/1916 | Young | B01D 29/05 | 210/418 |
| 1,284,233 A * | 11/1918 | Caen | B01D 29/15 | 210/323.1 |
| 1,432,522 A * | 10/1922 | Barnes | F25D 7/00 | 210/336 |
| 1,521,100 A * | 12/1924 | House | B01D 24/183 | 210/336 |
| 1,547,855 A * | 7/1925 | Burson | C02F 1/00 | 210/474 |
| 1,579,158 A * | 3/1926 | Smilie | C02F 1/003 | 137/151 |
| 1,621,684 A * | 3/1927 | Rabjohn | B01D 24/24 | 210/266 |
| 1,629,269 A * | 5/1927 | Hagg | C02F 1/003 | 210/462 |
| 1,645,712 A * | 10/1927 | Meyers | C02F 1/001 | 210/489 |
| 1,669,284 A * | 5/1928 | Chetham | B01D 35/28 | 210/477 |
| 1,674,203 A * | 6/1928 | Holz | C02F 1/283 | 210/489 |
| 1,723,564 A * | 8/1929 | Lewis | C02F 1/003 | 210/287 |
| 1,752,060 A * | 3/1930 | Burright | B01D 24/4869 | 210/318 |
| 2,335,458 A * | 11/1943 | Senyal | C02F 1/003 | 210/474 |
| D188,688 S * | 8/1960 | Sicard | D23/209 | |
| 3,339,743 A * | 9/1967 | Bealle | B01J 47/012 | 210/256 |
| 3,392,837 A * | 7/1968 | Sanzenbacher | B01D 35/00 | 210/282 |
| 3,430,769 A * | 3/1969 | Sanzenbacher | C02F 1/003 | 210/282 |
| 3,747,767 A * | 7/1973 | Hankammer | B01J 8/18 | 210/477 |
| 3,785,497 A * | 1/1974 | Giffard | B01D 24/04 | 206/526 |
| 4,149,454 A * | 4/1979 | Kemp | A47J 31/0621 | 99/295 |
| 4,181,243 A * | 1/1980 | Frahm | B67D 3/00 | 137/550 |
| 4,283,283 A * | 8/1981 | Zimmerman | C02F 1/283 | 210/455 |
| 4,306,971 A * | 12/1981 | Hankammer | C02F 1/003 | 210/282 |
| 4,419,235 A * | 12/1983 | Sway | C02F 1/76 | 210/474 |
| 4,491,520 A * | 1/1985 | Jaye | C02F 1/002 | D23/209 |
| 4,578,187 A * | 3/1986 | Alhauser | B01J 47/024 | 210/93 |
| 4,605,499 A * | 8/1986 | Wise | C02F 1/283 | 210/282 |
| 4,666,600 A * | 5/1987 | Hankammer | C02F 1/003 | 210/477 |
| 4,749,484 A * | 6/1988 | Greenhut | C02F 1/003 | 210/472 |
| 4,764,274 A * | 8/1988 | Miller | C02F 1/283 | 210/477 |
| 4,776,956 A * | 10/1988 | Gannaway | B01D 35/04 | D7/316 |
| 4,885,089 A * | 12/1989 | Hankammer | B01D 36/001 | 210/488 |
| 4,895,648 A * | 1/1990 | Hankammer | B01D 36/001 | 210/477 |
| 4,969,996 A * | 11/1990 | Hankammer | B01D 36/001 | D7/319 |
| D312,863 S * | 12/1990 | Hankammer | D23/209 | |
| 4,978,449 A * | 12/1990 | Devine | C02F 1/283 | 210/264 |
| 4,995,975 A * | 2/1991 | Jacquot | C02F 1/003 | 210/474 |
| 4,998,228 A * | 3/1991 | Eger | C02F 1/003 | 210/138 |
| 5,002,665 A * | 3/1991 | Brueggemann | B01D 35/30 | 210/282 |
| 5,049,272 A * | 9/1991 | Nieweg | B01D 24/04 | 210/282 |
| D320,640 S * | 10/1991 | Goodwin | D23/209 | |
| 5,076,922 A * | 12/1991 | DeAre | C02F 1/003 | 210/474 |
| D323,874 S * | 2/1992 | Hirman | D23/209 | |
| 5,128,036 A * | 7/1992 | Svensson | C02F 1/003 | 210/264 |
| 5,139,666 A * | 8/1992 | Charbonneau | B01D 35/04 | 210/264 |
| 5,173,192 A * | 12/1992 | Shalev | B67D 3/00 | 210/473 |
| 5,186,830 A * | 2/1993 | Rait | C02F 1/003 | 210/477 |
| D336,011 S * | 6/1993 | Bannigan | D23/209 | |
| 5,225,078 A * | 7/1993 | Polasky | C02F 1/003 | 210/477 |
| 5,238,559 A * | 8/1993 | Nieweg | B01J 47/024 | 220/372 |
| 5,238,576 A * | 8/1993 | Affonso | C02F 1/003 | 210/284 |
| 5,240,620 A * | 8/1993 | Shalev | B01D 35/04 | 210/473 |
| 5,308,482 A * | 5/1994 | Mead | C02F 1/003 | 210/207 |
| 5,318,703 A * | 6/1994 | Heiligman | C02F 1/003 | 210/264 |
| 5,328,597 A * | 7/1994 | Boldt, Jr. | C02F 1/003 | 222/23 |
| D354,795 S * | 1/1995 | Heligman | D23/209 | |
| 5,411,661 A * | 5/1995 | Heiligman | C02F 9/20 | 210/264 |
| 5,449,093 A * | 9/1995 | Burrows | B67D 3/0038 | 62/390 |
| D363,760 S * | 10/1995 | Morem | D23/209 | |
| D365,140 S * | 12/1995 | Raunkjaer | D23/209 | |
| 5,486,285 A * | 1/1996 | Feeney | B67D 3/00 | 210/85 |
| D370,711 S * | 6/1996 | Serenko | D23/209 | |
| 5,536,394 A * | 7/1996 | Lund | C02F 1/003 | 210/123 |
| 5,536,396 A * | 7/1996 | Mudra | A47J 31/605 | 210/474 |
| D374,911 S * | 10/1996 | Kahana | D23/209 | |
| 5,562,824 A * | 10/1996 | Magnusson | C02F 1/003 | 210/290 |
| 5,567,308 A * | 10/1996 | Visser | C02F 1/003 | 210/477 |
| 5,616,243 A * | 4/1997 | Levy | A23L 2/72 | 210/473 |
| 5,637,214 A * | 6/1997 | Kahana | C02F 1/003 | 210/477 |
| D380,535 S * | 7/1997 | Joergensen | D23/209 | |
| 5,652,008 A * | 7/1997 | Heiligman | C02F 1/003 | 248/312.1 |

(56) References Cited

U.S. PATENT DOCUMENTS

| | | | | |
|---|---|---|---|---|
| 5,653,878 A * | 8/1997 | Reid | ................... | B67D 3/0048 210/474 |
| 5,665,224 A * | 9/1997 | Levene | ................ | B01D 24/042 210/85 |
| D388,154 S * | 12/1997 | Pesa | ................... | D23/209 |
| 5,785,844 A * | 7/1998 | Lund | ................... | C02F 1/003 116/272 |
| 5,811,004 A * | 9/1998 | Robertson | ................ | C02F 1/003 210/473 |
| 5,846,418 A * | 12/1998 | Thompson | ................ | C02F 1/76 210/468 |
| 5,855,160 A * | 1/1999 | Shen | ................... | A47G 19/14 99/279 |
| 5,873,995 A * | 2/1999 | Huang | ................... | C02F 1/003 116/284 |
| 5,882,507 A * | 3/1999 | Tanner | ................... | C02F 1/003 210/473 |
| 5,900,138 A * | 5/1999 | Moretto | ................ | C02F 1/003 210/473 |
| 5,922,378 A * | 7/1999 | Kagan | ................... | C02F 1/686 426/74 |
| 5,928,506 A * | 7/1999 | Bae | ................... | C02F 1/003 210/123 |
| 5,980,743 A * | 11/1999 | Bairischer | .......... | B01D 39/1623 210/291 |
| 5,989,424 A * | 11/1999 | Serenko | ................ | C02F 1/003 210/282 |
| 5,997,734 A * | 12/1999 | Koski | ................ | B01D 35/143 210/100 |
| 6,012,232 A * | 1/2000 | Weyrauch | ................ | C02F 1/003 34/95 |
| 6,013,180 A * | 1/2000 | Wang | ................... | C02F 1/003 210/255 |
| 6,042,725 A * | 3/2000 | Serenko | ................ | C02F 1/003 210/282 |
| 6,053,482 A * | 4/2000 | Glenn | ................... | F24F 6/043 261/DIG. 46 |
| 6,074,550 A * | 6/2000 | Hofmann | ................ | C02F 1/003 210/473 |
| 6,099,728 A * | 8/2000 | Bairischer | ................ | C02F 1/003 210/291 |
| 6,103,114 A * | 8/2000 | Tanner | ................ | C02F 1/003 210/477 |
| 6,129,841 A * | 10/2000 | Dann | ................... | C02F 1/003 210/260 |
| D435,084 S * | 12/2000 | Northen | ................... | D23/209 |
| 6,159,363 A * | 12/2000 | Collins | ................... | C02F 1/003 210/473 |
| 6,178,290 B1 * | 1/2001 | Weyrauch | ................ | C02F 1/003 392/447 |
| 6,202,541 B1 * | 3/2001 | Cai | ................... | C02F 1/003 99/290 |
| 6,224,751 B1 * | 5/2001 | Hofmann | ................ | C02F 1/003 210/85 |
| 6,238,552 B1 * | 5/2001 | Shannon | ................ | C02F 1/003 210/473 |
| 6,248,244 B1 * | 6/2001 | Dann | ................... | C02F 1/003 210/764 |
| 6,254,768 B1 * | 7/2001 | Dulieu | ................... | C02F 1/003 210/473 |
| 6,290,847 B1 * | 9/2001 | Cutler | ................... | B01D 61/145 210/317 |
| 6,290,848 B1 * | 9/2001 | Tanner | ................... | C02F 1/003 210/282 |
| 6,354,344 B1 * | 3/2002 | Pluta | ................... | B67D 3/0029 141/192 |
| 6,387,260 B1 * | 5/2002 | Pimenov | ................ | B01J 47/024 210/288 |
| 6,402,949 B1 * | 6/2002 | Banks | ................... | C02F 1/002 210/411 |
| 6,405,875 B1 * | 6/2002 | Cutler | ................... | C02F 1/003 210/450 |
| 6,419,821 B1 * | 7/2002 | Gadgil | ................ | B01D 39/2068 210/256 |
| 6,423,224 B1 * | 7/2002 | Tanner | ................... | C02F 1/003 210/247 |
| 6,428,687 B1 * | 8/2002 | Moretto | ................ | F16K 31/001 210/100 |
| 6,440,302 B1 * | 8/2002 | Leipziger | ................ | C02F 1/003 210/473 |
| 6,454,941 B1 * | 9/2002 | Cutler | ................... | C02F 1/003 210/282 |
| 6,475,386 B1 * | 11/2002 | Carr | ................... | B01J 20/18 210/283 |
| 6,485,644 B2 * | 11/2002 | Bowler | ................... | C02F 1/003 210/473 |
| 6,524,477 B1 * | 2/2003 | Hughes | ................... | C02F 1/003 210/477 |
| 6,561,234 B2 * | 5/2003 | Pluta | ................... | B67D 3/0029 141/192 |
| 6,565,749 B1 * | 5/2003 | Hou | ................... | A61L 2/0017 210/321.86 |
| 6,574,984 B1 * | 6/2003 | McCrea | ................ | F25D 23/126 222/146.6 |
| 6,602,410 B1 * | 8/2003 | Tanner | ................... | C02F 1/003 210/201 |
| 6,602,425 B2 * | 8/2003 | Gadgil | ................ | B01D 39/2068 210/744 |
| 6,638,426 B1 * | 10/2003 | Fritter | ................ | B01D 36/001 210/282 |
| 6,649,045 B2 * | 11/2003 | Tanner | ................... | C02F 1/003 210/473 |
| 6,651,824 B2 * | 11/2003 | Miller | ................... | C02F 1/003 210/473 |
| 6,733,669 B1 * | 5/2004 | Crick | ................... | C02F 1/003 210/473 |
| 6,736,298 B2 * | 5/2004 | Busick | ................ | B67D 1/0869 222/189.09 |
| 6,811,691 B2 * | 11/2004 | Woodard, Jr. | ............ | A61L 2/10 220/756 |
| 6,835,311 B2 * | 12/2004 | Koslow | ................... | A61L 9/16 210/508 |
| D500,836 S * | 1/2005 | Nishi | ................... | D23/209 |
| 6,841,067 B1 * | 1/2005 | Hofmann | ................... | C02F 1/003 210/291 |
| D501,755 S * | 2/2005 | Namur | ................... | D7/397 |
| D501,912 S * | 2/2005 | Tanner | ................... | D23/209 |
| 6,860,992 B2 * | 3/2005 | Chau | ................... | C02F 1/003 99/290 |
| 6,881,327 B2 * | 4/2005 | Tanner | ................... | C02F 1/003 210/474 |
| 6,913,154 B2 * | 7/2005 | Koslow | ................... | C02F 1/004 210/489 |
| 6,948,666 B1 * | 9/2005 | Leadlay | ................ | B05B 15/40 239/377 |
| 6,953,523 B2 * | 10/2005 | Vandenbelt | ................ | C02F 9/20 210/138 |
| 6,953,604 B2 * | 10/2005 | Koslow | ................... | C02F 1/444 427/244 |
| 6,959,820 B2 * | 11/2005 | Koslow | ................ | B01J 20/28023 210/489 |
| 6,960,295 B2 * | 11/2005 | Chaouachi | ......... | A47J 27/21183 210/473 |
| 6,998,058 B2 * | 2/2006 | Koslow | ................ | B01J 20/3236 210/764 |
| 7,008,537 B2 * | 3/2006 | Koslow | ................... | C12H 1/0424 210/257.2 |
| 7,011,753 B2 * | 3/2006 | Koslow | ................ | B01J 20/28014 210/489 |
| 7,014,759 B2 * | 3/2006 | Radford | ................... | C02F 1/003 141/330 |
| D529,127 S * | 9/2006 | Cueman | ................... | D23/209 |
| 7,144,533 B2 * | 12/2006 | Koslow | ................ | B01J 20/28014 428/317.1 |
| 7,150,829 B2 * | 12/2006 | Na | ................... | C02F 1/003 210/679 |
| 7,153,424 B2 * | 12/2006 | Aalto | ................... | B01D 61/18 210/473 |

(56) References Cited

U.S. PATENT DOCUMENTS

| | | | | |
|---|---|---|---|---|
| 7,166,216 B2 * | 1/2007 | Woodard, Jr. | B01D 29/96 | 210/232 |
| 7,201,840 B2 * | 4/2007 | Tsataros | C02F 1/003 | 210/85 |
| 7,232,517 B1 * | 6/2007 | Shepherd | C02F 1/003 | 250/435 |
| D546,113 S * | 7/2007 | Ruoff | D23/209 | |
| 7,294,277 B2 * | 11/2007 | Moretto | C02F 1/003 | 210/85 |
| 7,306,723 B2 * | 12/2007 | Radford | C02F 1/003 | 141/330 |
| 7,309,418 B2 * | 12/2007 | Joyce | C02F 1/003 | 210/473 |
| D562,430 S * | 2/2008 | Slawomir | D23/209 | |
| D565,149 S * | 3/2008 | Slawomir | D23/209 | |
| D565,694 S * | 4/2008 | Slawomir | D23/209 | |
| D566,808 S * | 4/2008 | Slawomir | D23/209 | |
| D569,176 S * | 5/2008 | Bodum | D7/400 | |
| 7,387,729 B2 * | 6/2008 | Vandenbelt | C02F 1/003 | 210/336 |
| 7,396,461 B2 * | 7/2008 | Bommi | C02F 1/003 | 210/489 |
| 7,427,355 B2 * | 9/2008 | Chau | C02F 1/002 | 210/282 |
| D579,515 S * | 10/2008 | Bell | D23/209 | |
| 7,438,799 B2 * | 10/2008 | Vandenbelt | C02F 1/003 | 210/138 |
| 7,441,665 B2 * | 10/2008 | Bridges | C02F 1/50 | 210/753 |
| 7,470,364 B2 * | 12/2008 | Oranski | B67D 1/0895 | 210/748.1 |
| 7,473,362 B1 * | 1/2009 | Nohren, Jr. | C02F 1/002 | 210/660 |
| 7,507,338 B2 * | 3/2009 | Bommi | C02F 1/002 | 210/266 |
| 7,510,088 B2 * | 3/2009 | Smith | C02F 1/003 | 210/473 |
| D590,475 S * | 4/2009 | Bell | D23/209 | |
| 7,513,278 B2 * | 4/2009 | Hengsperger | C02F 1/003 | 141/85 |
| 7,569,138 B2 * | 8/2009 | Moretto | B01D 35/143 | 210/138 |
| 7,615,152 B2 * | 11/2009 | Tanner | B01D 39/2062 | 210/473 |
| 7,632,397 B2 * | 12/2009 | Bathula | C02F 1/008 | 210/260 |
| 7,645,381 B2 * | 1/2010 | Oranski | B67D 1/0895 | 210/338 |
| 7,670,479 B2 * | 3/2010 | Arett | C02F 1/003 | 210/474 |
| 7,678,282 B2 * | 3/2010 | Moretto | B01D 35/143 | 73/304 R |
| D614,259 S * | 4/2010 | Reid | D23/209 | |
| 7,695,615 B2 * | 4/2010 | Vinogradova | C02F 1/003 | 210/120 |
| 7,703,382 B2 * | 4/2010 | Oranski | B67D 1/0888 | 99/295 |
| D615,149 S * | 5/2010 | Reid | D23/209 | |
| D615,150 S * | 5/2010 | Reid | D23/209 | |
| 7,708,958 B2 * | 5/2010 | Namespetra | C02F 1/78 | 210/192 |
| 7,713,336 B2 * | 5/2010 | Hengsperger | B01D 53/261 | 96/117.5 |
| 7,722,761 B2 * | 5/2010 | Moretto | C02F 1/003 | 210/474 |
| D616,694 S * | 6/2010 | Kulikov | D23/209 | |
| D618,761 S * | 6/2010 | Reid | D23/209 | |
| 7,828,969 B2 * | 11/2010 | Eaton | B32B 5/26 | 210/282 |
| 7,850,859 B2 * | 12/2010 | Tanner | C02F 1/003 | 210/473 |
| 7,882,705 B2 * | 2/2011 | Flax | B67D 3/0029 | 62/3.64 |
| D633,595 S * | 3/2011 | Reid | D23/209 | |
| 7,906,019 B2 * | 3/2011 | Elliott | A01N 59/16 | 210/205 |
| D638,097 S * | 5/2011 | Busick | D23/209 | |
| 7,959,872 B2 * | 6/2011 | Namespetra | C02F 1/78 | 210/748.08 |
| 7,987,769 B2 * | 8/2011 | Oranski | B67D 1/0888 | 210/240 |
| 7,987,770 B2 * | 8/2011 | Klump | C02F 1/003 | 206/181 |
| 8,025,802 B2 * | 9/2011 | Walde | C02F 1/003 | 210/477 |
| D647,594 S * | 10/2011 | Bridges | D23/209 | |
| D647,595 S * | 10/2011 | Reid | D23/209 | |
| 8,043,502 B2 * | 10/2011 | Nauta | C02F 1/003 | 210/473 |
| D650,886 S * | 12/2011 | Bridges | D23/207 | |
| 8,080,160 B2 * | 12/2011 | Yanou | B01D 61/16 | 210/321.89 |
| 8,114,284 B2 * | 2/2012 | Walde | C02F 1/003 | 210/477 |
| 8,128,820 B2 * | 3/2012 | Wu | C02F 1/003 | 210/260 |
| 8,167,141 B2 * | 5/2012 | Knipmeyer | C02F 1/003 | 210/283 |
| 8,177,966 B2 * | 5/2012 | Wu | C02F 1/003 | 210/260 |
| 8,192,619 B2 * | 6/2012 | Patera | C02F 1/003 | 210/243 |
| 8,202,419 B2 * | 6/2012 | Wallerstorfer | A47J 31/605 | 210/287 |
| 8,216,451 B2 * | 7/2012 | Walde | B01D 35/1576 | 210/477 |
| 8,216,465 B2 * | 7/2012 | Nauta | C02F 1/003 | 210/473 |
| 8,298,408 B2 * | 10/2012 | Moretto | C02F 1/003 | 210/474 |
| D675,861 S * | 2/2013 | Gray | D7/317 | |
| D676,108 S * | 2/2013 | Kulikov | D23/209 | |
| 8,371,452 B2 * | 2/2013 | Swain | C02F 1/003 | 210/468 |
| 8,413,844 B2 * | 4/2013 | Arett | A47G 19/12 | 222/162 |
| D684,009 S * | 6/2013 | Bell | D7/397 | |
| 8,480,882 B2 * | 7/2013 | Cueman | C02F 1/003 | 210/474 |
| 8,541,039 B2 * | 9/2013 | Lackey | C02F 1/003 | 99/275 |
| 8,550,257 B2 * | 10/2013 | Harvey | C02F 1/003 | 501/80 |
| D717,912 S * | 11/2014 | Huda | D23/209 | |
| 8,986,544 B2 * | 3/2015 | Bommi | C02F 1/003 | 210/282 |
| 8,992,781 B2 * | 3/2015 | Daniely | C02F 1/78 | 210/764 |
| D729,344 S * | 5/2015 | Colussi | D23/209 | |
| 9,023,205 B2 * | 5/2015 | Namur | A47J 31/605 | 210/282 |
| 9,132,369 B2 * | 9/2015 | Bell | C02F 1/003 | |
| 9,193,605 B2 * | 11/2015 | Minton-Edison | C02F 1/002 | |
| 9,248,391 B2 * | 2/2016 | Bommi | B01D 39/2062 | |
| 9,352,979 B2 * | 5/2016 | Kuennen | C02F 3/06 | |
| 9,359,225 B1 * | 6/2016 | Caldwell | B01D 36/001 | |
| 9,382,131 B1 * | 7/2016 | Shotey | C02F 1/003 | |
| D772,635 S * | 11/2016 | Zhu | D7/319 | |
| D775,311 S * | 12/2016 | Cooper | D23/209 | |
| 9,511,315 B2 * | 12/2016 | Cur | B01D 15/10 | |
| 9,539,526 B2 * | 1/2017 | Bradford | B01D 29/00 | |
| 9,550,138 B2 * | 1/2017 | Bradford | B01D 15/10 | |
| D790,659 S * | 6/2017 | Rummel | D23/209 | |
| 9,670,076 B2 * | 6/2017 | Rajan | C02F 1/283 | |
| D792,941 S * | 7/2017 | Rummel | D23/209 | |
| 9,725,333 B2 * | 8/2017 | Arah | B01D 63/024 | |
| 9,731,234 B2 * | 8/2017 | Cur | B01D 15/10 | |
| 9,745,105 B2 * | 8/2017 | Parekh | B65D 47/265 | |

(56) References Cited

U.S. PATENT DOCUMENTS

| | | | |
|---|---|---|---|
| D796,245 S * | 9/2017 | Plihal | D23/209 |
| 9,796,600 B2 | 10/2017 | Shotey | A47J 31/20 |
| 9,809,462 B2 * | 11/2017 | Hawes | B01D 71/26 |
| 9,849,407 B2 * | 12/2017 | Huda | B01D 29/00 |
| D812,187 S * | 3/2018 | Del Ponte | D23/209 |
| 9,937,446 B1 * | 4/2018 | McDonald | A47G 19/12 |
| 9,950,933 B1 * | 4/2018 | Rinker | C02F 1/003 |
| 9,975,068 B1 * | 5/2018 | Maresh | B01D 24/00 |
| D820,385 S * | 6/2018 | Bell | D23/209 |
| 9,994,461 B2 * | 6/2018 | Mitchell | C02F 1/003 |
| 10,011,499 B2 * | 7/2018 | Mayo | C02F 1/003 |
| 10,016,705 B2 * | 7/2018 | Hull | B01D 29/03 |
| 10,023,476 B2 * | 7/2018 | Takeda | C02F 1/44 |
| 10,035,713 B2 * | 7/2018 | Dani | C02F 1/283 |
| D827,086 S * | 8/2018 | Bell | D23/209 |
| 10,046,981 B2 * | 8/2018 | Wilder | C02F 1/003 |
| 10,053,377 B2 * | 8/2018 | Ono | B01D 15/362 |
| 10,059,603 B2 * | 8/2018 | Del Ponte | C02F 1/002 |
| 10,071,851 B2 * | 9/2018 | Vu | A47J 31/0689 |
| 10,094,097 B2 * | 10/2018 | Mun | B01D 29/114 |
| 10,099,942 B2 * | 10/2018 | Kellam | C02F 1/705 |
| 10,118,113 B2 * | 11/2018 | Shotey | B01D 33/0108 |
| 10,125,027 B2 * | 11/2018 | Dani | C02F 1/002 |
| 10,167,204 B2 * | 1/2019 | Utsch | B01D 27/14 |
| 10,178,921 B1 * | 1/2019 | Rinker | A47G 19/12 |
| 10,196,282 B2 * | 2/2019 | Boudreau | C02F 1/003 |
| D844,102 S * | 3/2019 | DeAngelo | D23/209 |
| D846,069 S * | 4/2019 | Zou | D23/209 |
| 10,252,854 B2 * | 4/2019 | Vu | A47J 31/0689 |
| 10,307,697 B2 * | 6/2019 | Savoy | C02F 1/003 |
| 10,335,717 B2 * | 7/2019 | Huda | B01D 29/21 |
| 10,336,627 B2 * | 7/2019 | Poindexter | C02F 1/68 |
| 10,336,629 B2 * | 7/2019 | Mitchell | B01D 39/2024 |
| 10,336,639 B2 * | 7/2019 | Kuennen | C02F 1/281 |
| 10,343,931 B2 * | 7/2019 | Dani | B01D 29/114 |
| 10,351,442 B2 * | 7/2019 | Dani | B01D 29/0097 |
| 10,391,427 B2 * | 8/2019 | Dani | B01D 29/96 |
| 10,427,951 B2 * | 10/2019 | Dani | B01J 47/024 |
| 10,435,313 B2 * | 10/2019 | Kellam | B01D 24/22 |
| 10,479,697 B2 * | 11/2019 | Dani | B01D 29/15 |
| D877,565 S * | 3/2020 | Pehar | D77/532 |
| 10,589,199 B2 * | 3/2020 | See | C02F 1/444 |
| 10,589,200 B1 * | 3/2020 | Maresh | C02F 1/001 |
| D882,322 S * | 4/2020 | Anderson | D7/317 |
| 10,647,592 B2 * | 5/2020 | Geelhood | C02F 1/002 |
| 10,654,725 B2 * | 5/2020 | Dani | C02F 1/283 |
| 10,669,163 B2 * | 6/2020 | Swain | C02F 1/003 |
| 10,722,828 B2 * | 7/2020 | Shotey | C02F 1/003 |
| 10,759,674 B2 * | 9/2020 | DeAngelo | C02F 1/003 |
| 10,765,973 B2 * | 9/2020 | Dani | B01D 29/111 |
| 10,787,371 B2 * | 9/2020 | Arah | B01D 63/024 |
| D900,278 S * | 10/2020 | Lu | D23/209 |
| 10,822,249 B2 * | 11/2020 | McDonald | C02F 1/003 |
| 10,905,976 B2 * | 2/2021 | Johnson | B01D 21/0012 |
| 10,906,819 B2 * | 2/2021 | Liao | A61L 2/10 |
| 10,919,780 B2 * | 2/2021 | Anderson | C02F 1/003 |
| 10,981,093 B2 * | 4/2021 | Shotey | C02F 1/003 |
| 11,001,508 B2 * | 5/2021 | Dani | C02F 1/003 |
| 11,033,841 B1 * | 6/2021 | Shotey | B01D 33/74 |
| 11,045,751 B2 * | 6/2021 | Dani | B01D 29/96 |
| 11,053,137 B1 * | 7/2021 | Knopke | B01J 20/28016 |
| 11,066,311 B2 * | 7/2021 | Dani | C02F 1/283 |
| D934,377 S * | 10/2021 | Schuler | D23/209 |
| 11,142,475 B2 * | 10/2021 | Liu | C02F 1/002 |
| 11,161,062 B2 * | 11/2021 | Johnson | C02F 9/20 |
| 11,174,172 B2 * | 11/2021 | Dani | C02F 1/003 |
| D940,494 S * | 1/2022 | Ding | D7/316 |
| 11,364,456 B2 * | 6/2022 | Macoretta | B01D 29/05 |
| 11,407,652 B2 * | 8/2022 | Dani | B01D 29/15 |
| D963,393 S * | 9/2022 | Ongaro | D23/209 |
| 11,433,324 B2 * | 9/2022 | Cabbage | C02F 1/44 |
| 11,452,399 B1 * | 9/2022 | Murphy | A47J 19/005 |
| 11,465,914 B2 * | 10/2022 | Pehar | C02F 1/003 |
| 11,498,851 B2 * | 11/2022 | Kuennen | C02F 1/283 |
| 11,518,581 B2 * | 12/2022 | Parekh | B65D 47/265 |
| 11,596,882 B2 * | 3/2023 | Mueller | C02F 1/003 |
| 11,613,477 B2 * | 3/2023 | Cordova | C02F 1/002 210/232 |
| 11,713,255 B2 * | 8/2023 | Knopke | C02F 1/288 210/435 |
| 2002/0005377 A1 * | 1/2002 | Tanner | C02F 1/42 210/226 |
| 2002/0040585 A1 * | 4/2002 | Chaney | B67D 1/0857 62/391 |
| 2002/0066698 A1 * | 6/2002 | Brunner | C02F 1/003 210/474 |
| 2002/0070153 A1 * | 6/2002 | Bowler | C02F 9/20 210/466 |
| 2002/0083841 A1 * | 7/2002 | Chaouachi | C02F 1/003 99/279 |
| 2002/0092813 A1 * | 7/2002 | Radford | C02F 1/003 210/473 |
| 2002/0113022 A1 * | 8/2002 | Gadgil | B01D 39/2068 210/748.11 |
| 2002/0125187 A1 * | 9/2002 | Tanner | C02F 1/003 210/477 |
| 2002/0134715 A1 * | 9/2002 | Tanner | C02F 1/003 210/473 |
| 2002/0170618 A1 * | 11/2002 | Pluta | C02F 1/003 141/286 |
| 2003/0034283 A1 * | 2/2003 | Tsataros | B01D 29/603 210/85 |
| 2003/0034291 A1 * | 2/2003 | Miller | C02F 1/003 210/244 |
| 2003/0085169 A1 * | 5/2003 | Reid | B01D 24/005 210/473 |
| 2003/0111404 A1 * | 6/2003 | Koslow | B01J 20/28033 210/488 |
| 2003/0159979 A1 * | 8/2003 | Chau | B01D 24/08 210/284 |
| 2003/0168401 A1 * | 9/2003 | Koslow | A61L 2/0017 210/488 |
| 2003/0196944 A1 * | 10/2003 | Tanner | C02F 1/003 210/201 |
| 2003/0196963 A1 * | 10/2003 | Koslow | B01J 20/3204 210/252 |
| 2003/0196964 A1 * | 10/2003 | Koslow | B01J 20/3236 210/252 |
| 2003/0201231 A1 * | 10/2003 | Koslow | B01J 20/3236 210/488 |
| 2003/0205529 A1 * | 11/2003 | Koslow | B01D 29/15 210/488 |
| 2003/0205530 A1 * | 11/2003 | Koslow | A61L 2/0017 210/488 |
| 2003/0205531 A1 * | 11/2003 | Koslow | B01J 20/3212 210/488 |
| 2003/0213750 A1 * | 11/2003 | Koslow | C02F 1/444 210/488 |
| 2004/0011721 A1 * | 1/2004 | Aalto | B01D 61/18 210/321.6 |
| 2004/0060873 A1 * | 4/2004 | Yanou | B01D 61/18 210/660 |
| 2004/0129617 A1 * | 7/2004 | Tanner | C02F 1/003 210/767 |
| 2004/0134932 A1 * | 7/2004 | Lobdell | B67D 3/0029 222/189.06 |
| 2004/0149642 A1 * | 8/2004 | Vandenbelt | C02F 1/003 210/282 |
| 2004/0149643 A1 * | 8/2004 | Vandenbelt | C02F 9/20 210/748.13 |
| 2004/0168957 A1 * | 9/2004 | Tsataros | B01D 29/603 210/85 |
| 2004/0173507 A1 * | 9/2004 | Tanner | C02F 1/003 210/474 |
| 2005/0072729 A1 * | 4/2005 | Bridges | C02F 1/50 210/450 |
| 2005/0109683 A1 * | 5/2005 | Joyce | C02F 1/003 210/473 |
| 2005/0139540 A1 * | 6/2005 | Mierau | B01J 20/18 210/504 |

(56) References Cited

U.S. PATENT DOCUMENTS

| | | | |
|---|---|---|---|
| 2005/0224422 A1* | 10/2005 | Moretto | C02F 1/003 210/85 |
| 2005/0279689 A1* | 12/2005 | Oranski | B67D 1/16 210/232 |
| 2006/0000763 A1* | 1/2006 | Rinker | C02F 1/003 210/502.1 |
| 2006/0113258 A1* | 6/2006 | Radford | C02F 1/003 210/232 |
| 2006/0144781 A1* | 7/2006 | Carlson | B01D 61/20 210/473 |
| 2006/0157399 A1* | 7/2006 | Vandenbelt | C02F 1/003 203/10 |
| 2006/0162806 A1* | 7/2006 | Hengsperger | A47J 31/605 141/286 |
| 2006/0163148 A1* | 7/2006 | Hengsperger | C02F 1/003 210/473 |
| 2006/0163169 A1* | 7/2006 | Eckhardt | C02F 1/008 210/748.11 |
| 2006/0163174 A1* | 7/2006 | Namespetra | C02F 1/78 210/192 |
| 2006/0191824 A1* | 8/2006 | Arett | C02F 1/003 210/473 |
| 2006/0226064 A1* | 10/2006 | Beckman | C02F 1/003 210/474 |
| 2006/0231476 A1* | 10/2006 | Vandenbelt | C02F 1/003 210/282 |
| 2006/0249442 A1* | 11/2006 | Yap | C02F 1/003 210/474 |
| 2006/0260990 A1* | 11/2006 | Joyce | C02F 1/003 210/85 |
| 2007/0102332 A1* | 5/2007 | Bommi | B01D 21/0024 210/418 |
| 2007/0151979 A1* | 7/2007 | Klump | B65D 43/20 220/912 |
| 2007/0187315 A1* | 8/2007 | Vinogradova | C02F 1/003 210/85 |
| 2007/0209984 A1* | 9/2007 | Lev | C02F 1/325 210/473 |
| 2007/0215536 A1* | 9/2007 | Bommi | C02F 1/003 210/282 |
| 2007/0221561 A1* | 9/2007 | Funkhouser | B01D 27/08 210/232 |
| 2007/0278141 A1* | 12/2007 | Patera | C02F 1/003 210/473 |
| 2008/0023406 A1* | 1/2008 | Rawson | C02F 1/003 210/688 |
| 2008/0035552 A1* | 2/2008 | Lee | C02F 1/003 210/446 |
| 2008/0035582 A1* | 2/2008 | Moretto | C02F 1/003 210/746 |
| 2008/0087596 A1* | 4/2008 | Bommi | C02F 1/002 210/232 |
| 2008/0110820 A1* | 5/2008 | Knipmeyer | C02F 1/003 210/477 |
| 2008/0116146 A1* | 5/2008 | Herrington | C02F 1/467 210/192 |
| 2008/0190825 A1* | 8/2008 | Hengsperger | B01D 53/261 210/95 |
| 2008/0202992 A1* | 8/2008 | Bridges | C02F 1/003 210/85 |
| 2008/0202996 A1* | 8/2008 | Oranski | B67D 1/0888 210/232 |
| 2008/0217252 A1* | 9/2008 | Elliott | A01N 59/16 210/661 |
| 2008/0223797 A1* | 9/2008 | Reid | B01D 29/35 210/291 |
| 2008/0314808 A1* | 12/2008 | Vandenbelt | C02F 1/003 210/85 |
| 2009/0001011 A1* | 1/2009 | Knipmeyer | B01D 39/2062 210/283 |
| 2009/0039028 A1* | 2/2009 | Eaton | B01J 20/28028 210/679 |
| 2009/0039032 A1* | 2/2009 | Patera | C02F 1/003 210/85 |
| 2009/0057220 A1* | 3/2009 | Nauta | C02F 1/003 210/282 |
| 2009/0057241 A1* | 3/2009 | Nauta | C02F 1/003 210/232 |
| 2009/0071890 A1* | 3/2009 | Oranski | C02F 9/20 210/234 |
| 2009/0199722 A1* | 8/2009 | Bodum | A47J 31/0636 210/474 |
| 2009/0200215 A1* | 8/2009 | Bathula | C02F 1/008 210/260 |
| 2009/0202691 A1* | 8/2009 | Gauger | A47J 31/20 210/473 |
| 2010/0006507 A1* | 1/2010 | Tanner | B01D 39/2062 210/669 |
| 2010/0006508 A1* | 1/2010 | Mitchell | C02F 1/28 210/252 |
| 2010/0068343 A1* | 3/2010 | Johann | C02F 1/68 210/260 |
| 2010/0133297 A1* | 6/2010 | Arett | A47G 19/12 222/129 |
| 2010/0163470 A1* | 7/2010 | Oranski | B67D 1/001 210/209 |
| 2010/0176037 A1* | 7/2010 | Namespetra | C02F 1/78 210/85 |
| 2010/0215552 A1* | 8/2010 | Wu | C02F 1/003 422/186.3 |
| 2010/0243582 A1* | 9/2010 | Riedel | C02F 1/004 210/435 |
| 2010/0243583 A1* | 9/2010 | Riedel | C02F 1/001 210/435 |
| 2010/0320135 A1* | 12/2010 | Sun | C02F 1/003 210/244 |
| 2011/0000841 A1* | 1/2011 | Rusinov | B29C 45/14336 210/282 |
| 2011/0005991 A1* | 1/2011 | Merz | C02F 1/003 210/244 |
| 2011/0056386 A1* | 3/2011 | Taketani | A47G 19/14 99/317 |
| 2011/0073551 A1* | 3/2011 | Reid | B01D 29/35 210/323.1 |
| 2011/0084006 A1* | 4/2011 | Wu | C02F 1/003 210/85 |
| 2011/0089103 A1* | 4/2011 | Bommi | B01D 36/001 210/472 |
| 2011/0125563 A1* | 5/2011 | Klein | G06Q 10/06 705/500 |
| 2011/0290741 A1* | 12/2011 | Cueman | C02F 1/003 210/91 |
| 2011/0300275 A1* | 12/2011 | Lackey | C02F 1/003 426/431 |
| 2011/0303589 A1* | 12/2011 | Kuennen | C02F 1/52 210/120 |
| 2011/0303618 A1* | 12/2011 | Cueman | C02F 1/003 210/232 |
| 2011/0303623 A1* | 12/2011 | Caldwell | C02F 1/003 210/807 |
| 2012/0012515 A1* | 1/2012 | Nauta | C02F 1/003 210/232 |
| 2012/0048787 A1* | 3/2012 | Rajan | B01D 27/101 210/85 |
| 2012/0061312 A1* | 3/2012 | Busick | C02F 1/003 210/474 |
| 2012/0061313 A1* | 3/2012 | Swain | C02F 1/003 210/472 |
| 2012/0091070 A1* | 4/2012 | Sjauta | C02F 1/003 210/764 |
| 2012/0111803 A1* | 5/2012 | Daniely | C02F 1/78 210/760 |
| 2012/0148707 A1* | 6/2012 | Lackey | C02F 1/003 99/290 |
| 2012/0187052 A1* | 7/2012 | Elliott | A01N 59/16 210/764 |
| 2012/0267314 A1* | 10/2012 | Minton-Edison | C02F 1/44 210/695 |

(56) References Cited

U.S. PATENT DOCUMENTS

| | | | |
|---|---|---|---|
| 2012/0298614 A1* | 11/2012 | Nelson | B65D 51/24 215/308 |
| 2013/0017303 A1* | 1/2013 | Vu | A47J 31/0689 426/433 |
| 2013/0175228 A1* | 7/2013 | Utsch | B01D 27/02 210/232 |
| 2013/0199974 A1* | 8/2013 | Shmidt | C02F 1/003 210/104 |
| 2013/0213874 A1* | 8/2013 | Boskov | C02F 1/003 210/263 |
| 2013/0213877 A1* | 8/2013 | Lin | B01D 27/148 210/338 |
| 2013/0233890 A1* | 9/2013 | Melzer | C02F 1/003 222/189.06 |
| 2013/0277298 A1* | 10/2013 | Sanocki | C02F 1/003 210/284 |
| 2014/0014566 A1* | 1/2014 | Mitchell | C02F 1/42 210/266 |
| 2014/0027368 A1* | 1/2014 | Bell | B01D 35/30 210/470 |
| 2014/0083924 A1* | 3/2014 | Bergendal | C02F 1/003 210/451 |
| 2014/0110325 A1* | 4/2014 | Swain | C02F 1/003 210/232 |
| 2014/0144829 A1* | 5/2014 | Takeda | C02F 1/42 210/295 |
| 2014/0151284 A1* | 6/2014 | Cur | B01D 15/10 427/237 |
| 2014/0216993 A1* | 8/2014 | Pradeep | B01D 29/00 210/123 |
| 2014/0263020 A1* | 9/2014 | MacDonald | C02F 1/003 210/232 |
| 2015/0014233 A1* | 1/2015 | Huda | B01D 36/001 210/188 |
| 2015/0122725 A1* | 5/2015 | Del Ponte | C02F 1/002 210/489 |
| 2015/0129484 A1* | 5/2015 | Bommi | B01D 29/13 210/436 |
| 2015/0239749 A1* | 8/2015 | Arah | C02F 1/003 210/321.89 |
| 2015/0344322 A1* | 12/2015 | Simandl | B01D 61/28 210/489 |
| 2016/0023918 A1* | 1/2016 | Kellam | C02F 1/42 210/806 |
| 2016/0059155 A1* | 3/2016 | Lombardo | B01D 29/23 703/1 |
| 2016/0075477 A1* | 3/2016 | Halioua | A47J 31/446 220/592.16 |
| 2016/0096718 A1* | 4/2016 | Gallardo | B01D 35/02 222/189.06 |
| 2016/0114271 A1* | 4/2016 | Michaud | C02F 1/003 210/807 |
| 2016/0167980 A1* | 6/2016 | Dani | C02F 1/283 210/466 |
| 2016/0167981 A1* | 6/2016 | Utsch | B01D 27/02 210/232 |
| 2016/0200598 A1* | 7/2016 | Rajan | C02F 1/283 210/314 |
| 2016/0220925 A1* | 8/2016 | Savoy | B01D 27/06 |
| 2016/0236958 A1* | 8/2016 | Kuennen | C02F 1/283 |
| 2016/0250573 A1* | 9/2016 | Hawes | B01D 39/14 210/454 |
| 2016/0257575 A1* | 9/2016 | Hawes | C02F 1/44 |
| 2016/0376161 A1* | 12/2016 | Dani | C02F 1/003 210/660 |
| 2016/0376162 A1* | 12/2016 | Dani | C02F 1/002 210/266 |
| 2016/0376163 A1* | 12/2016 | Dani | C02F 1/003 210/419 |
| 2016/0376164 A1* | 12/2016 | Dani | C02F 1/003 210/444 |
| 2016/0376165 A1* | 12/2016 | Dani | C02F 1/003 210/444 |
| 2017/0001880 A1* | 1/2017 | Dani | B01D 35/30 |
| 2017/0007949 A1* | 1/2017 | Mayo | C02F 1/003 |
| 2017/0027376 A1* | 2/2017 | Vu | A47J 31/0689 |
| 2017/0050127 A1* | 2/2017 | Dani | B01J 20/28052 |
| 2017/0065914 A1* | 3/2017 | Shotey | C02F 1/003 |
| 2017/0128863 A1* | 5/2017 | Hull | B01D 29/05 |
| 2017/0144896 A1* | 5/2017 | Takeda | B01D 61/18 |
| 2017/0215611 A1* | 8/2017 | Rinker | C02F 1/003 |
| 2017/0283281 A1* | 10/2017 | Arah | B01D 61/18 |
| 2018/0016158 A1* | 1/2018 | McDonald | B67D 3/0019 |
| 2018/0071660 A1* | 3/2018 | Huda | C02F 1/003 |
| 2018/0154290 A1* | 6/2018 | See | C02F 1/002 |
| 2018/0207560 A1* | 7/2018 | Shotey | B01D 33/74 |
| 2018/0250615 A1* | 9/2018 | Dani | B01D 29/216 |
| 2018/0264382 A1* | 9/2018 | Dani | B01D 27/08 |
| 2018/0265374 A1* | 9/2018 | Dani | B01D 29/114 |
| 2018/0273398 A1* | 9/2018 | Pehar | A45F 3/16 |
| 2018/0280838 A1* | 10/2018 | Johnson | B01D 21/0012 |
| 2018/0282178 A1* | 10/2018 | Poindexter | A47J 31/18 |
| 2018/0319672 A1* | 11/2018 | Dani | B01D 29/114 |
| 2019/0000262 A1* | 1/2019 | Vu | A47J 31/0689 |
| 2019/0002193 A1* | 1/2019 | Vu | B65D 85/8061 |
| 2019/0031529 A1* | 1/2019 | DeAngelo | C02F 1/283 |
| 2019/0135660 A1* | 5/2019 | Liao | C02F 1/325 |
| 2019/0322542 A1* | 10/2019 | Dani | B01D 29/114 |
| 2019/0345039 A1* | 11/2019 | Anderson | C02F 1/283 |
| 2019/0374880 A1* | 12/2019 | Dani | B01D 27/08 |
| 2020/0009482 A1* | 1/2020 | Weitz | B01D 24/38 |
| 2020/0071189 A1* | 3/2020 | Geelhood | C02F 1/283 |
| 2020/0087166 A1* | 3/2020 | Dani | B01D 35/30 |
| 2020/0095029 A1* | 3/2020 | Pehar | B65D 51/16 |
| 2020/0102144 A1* | 4/2020 | Vu | B65D 85/8052 |
| 2020/0215463 A1* | 7/2020 | Johnson | B01D 35/027 |
| 2020/0283310 A1* | 9/2020 | Collins | C02F 1/003 |
| 2021/0107805 A1* | 4/2021 | Zhibin | C02F 1/283 |
| 2021/0169264 A1* | 6/2021 | Waggoner | B65D 81/3216 |
| 2021/0171360 A1* | 6/2021 | Horn | C02F 1/42 |
| 2021/0322903 A1* | 10/2021 | Astle | B01D 35/153 |
| 2021/0323839 A1* | 10/2021 | Knopke | C02F 1/003 |
| 2022/0017383 A1* | 1/2022 | Petner | C02F 1/66 |
| 2022/0047975 A1* | 2/2022 | Johnson | B01D 29/58 |
| 2022/0081338 A1* | 3/2022 | Petner | C02F 1/66 |
| 2023/0150810 A1* | 5/2023 | Vestergaard-Frandsen | B65D 47/247 222/173 |

* cited by examiner

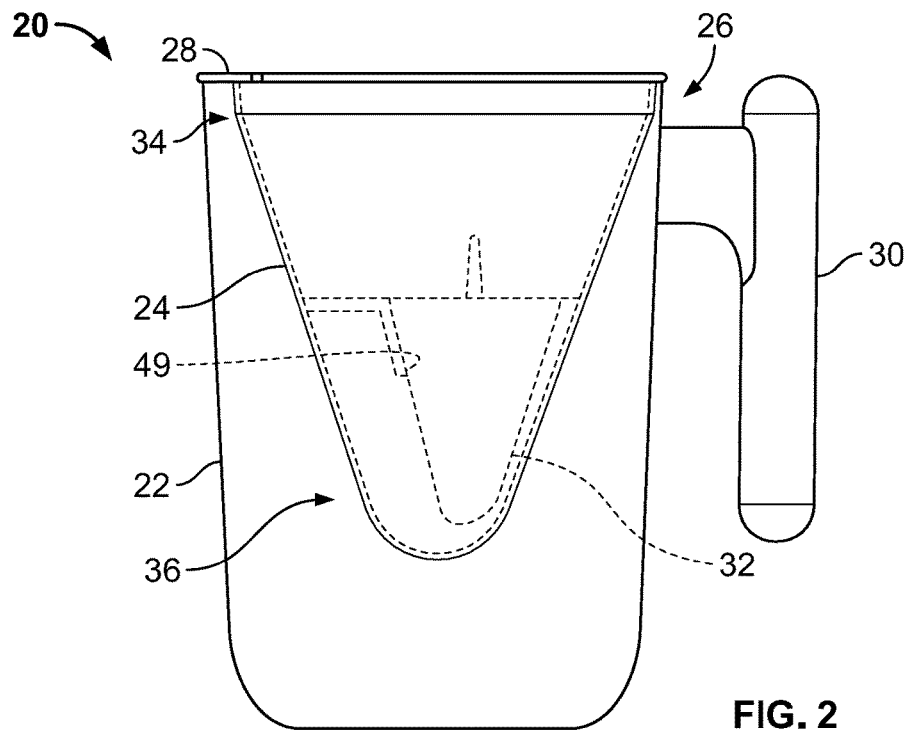
FIG. 2
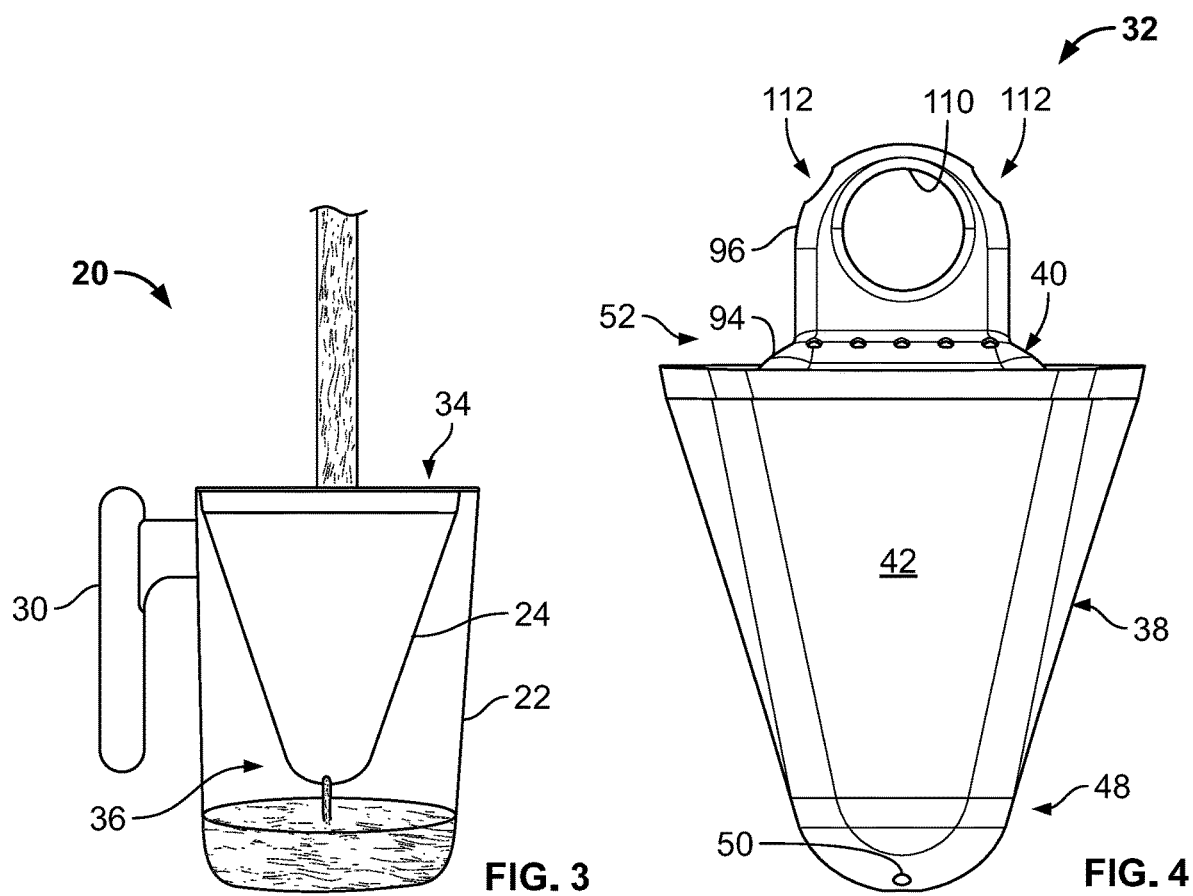
FIG. 3
FIG. 4

WATER FILTER CARTRIDGE HAVING AN AIR VENT

BACKGROUND

The present invention relates generally to water filter systems, and more particularly to a replaceable water filter cartridge for a water filter system.

Residential potable water is delivered to homes from water sources such as wells and municipal water systems. While this water may be treated, the incoming or feed water typically still has sediment and other impurities. To remove the sediment and impurities, many households have a filter system connected directly to the incoming water pipe that is located in a basement or a garage. Alternatively, water filter systems may be connected to a faucet such as a kitchen faucet. These systems are typically mounted underneath a sink or placed on a countertop and connected to the faucet. Water is directed from the incoming water line, through a filter element, which filters out any remaining sediment and impurities, and then out through the faucet. Such filter systems, however, can be expensive to install and maintain.

Another option is a water pitcher filter system, which includes a specially designed pitcher having a pitcher insert or reservoir near the top of the pitcher that receives a removable filter cartridge. In such a system, the reservoir is filled with a designated amount of water. The water passes through a filter cartridge to remove impurities and is stored in a bottom portion or dispenser portion of the pitcher prior to being poured into a glass or other container.

Filter cartridges in conventional water pitcher systems are smaller and typically less expensive to replace than household, under-counter and above-counter water filter systems. One problem with water pitcher filter systems, however, is that air from the water can be trapped by the filter cartridge during the filtering process and significantly slow the flow of water through the filter cartridge or stop the flow of water completely.

Therefore, there is a need for a water filter cartridge for a water pitcher filter system that filters impurities while providing adequate water flow through the water filter cartridge.

SUMMARY

A water filter system is provided for a water container that includes a removable filter cartridge with a handle where the handle includes at least one vent hole that extends above the filter cartridge to release air from the filter cartridge that is generated during filtration. The handle is configured to extend above the water level within the filter cartridge so that the air generated during filtration will be directed out of the filter cartridge through the at least one vent hole.

More specifically, a water filter system is provided that includes a filter cartridge removably secured in a container. The filter cartridge includes a handle extending from the filter cartridge, where the handle includes at least one vent hole, so that air within the filter housing moves outwardly through the at least vent hole during filtration.

In another embodiment, a water filter system is provided that includes a container, a funnel member seated in the container and a filter cartridge removably secured in the funnel member. The filter cartridge includes a filter housing and a cover attached to the filter housing, where the cover includes a handle extending from a surface of the cover. The handle has a pair of vent holes configured to release air from the filter cartridge during filtration.

BRIEF DESCRIPTION OF THE DRAWINGS

FIG. 2 is a perspective view of the pitcher of FIG. 1 showing the filter cartridge inserted in the pitcher;

FIG. 3 is a perspective view of the pitcher of FIG. 1 showing water entering the top of the pitcher and exiting the filter component into the housing;

FIG. 4 is a front perspective view of the filter cartridge of the water filter system of FIG. 1;

DETAILED DESCRIPTION

Figure 1:
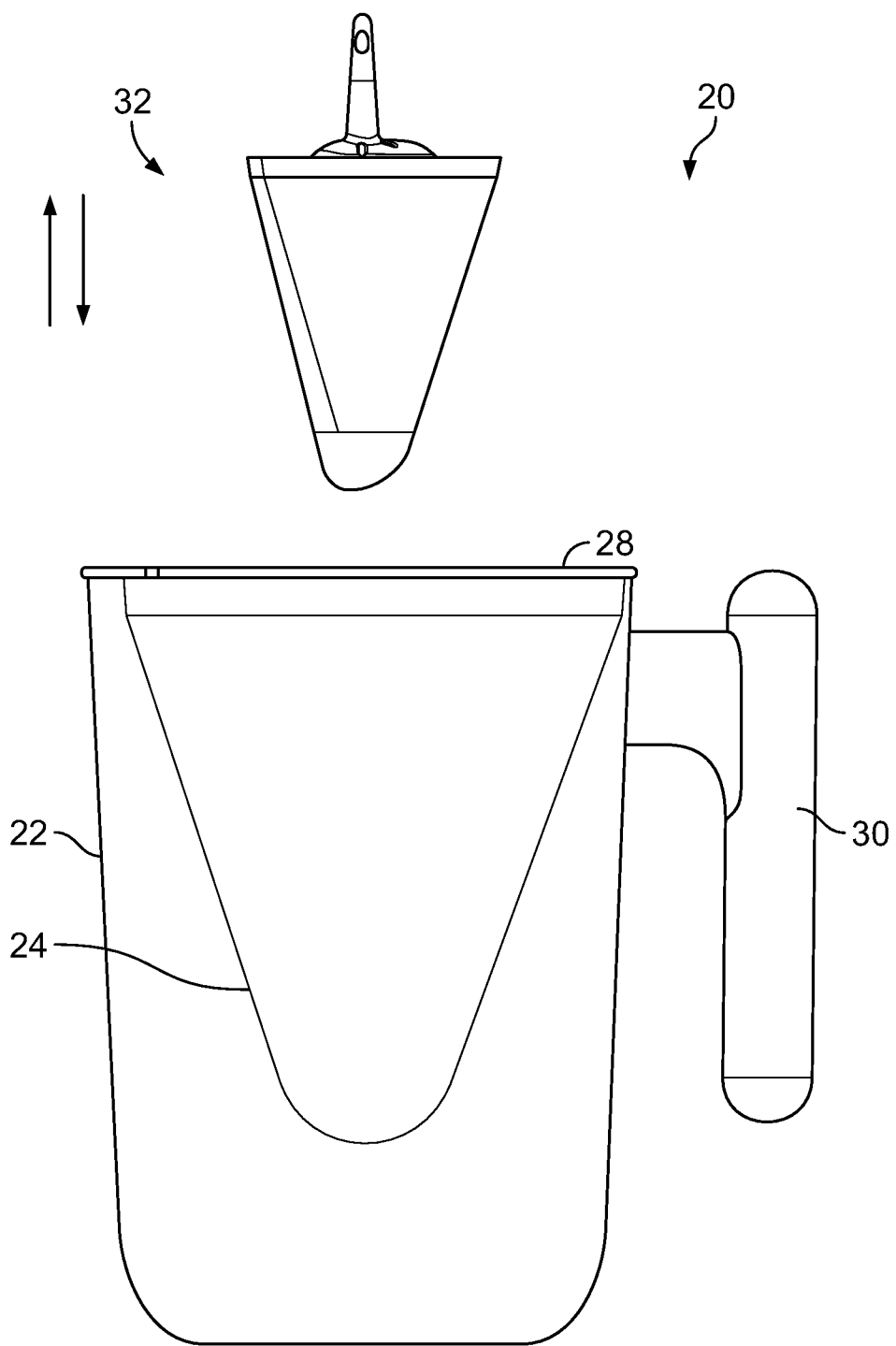
FIG. 1 is an exploded perspective view of the present water filter system.

Referring now to FIGS. 1-4, a water filter system, generally designated as 20, is used in homes, businesses and other facilities to filter water, i.e., remove impurities from the water, and store the filtered water in a container. As shown in FIG. 1, in an embodiment, a container 22, such as a water pitcher, is used to store filtered water. The container 22 includes a funnel member 24 seated on the top end 26 of the container, a lid 28 removably attached to the container 22 and a handle 30. A removable water filter cartridge 32 is inserted in the funnel member 24 as shown in FIGS. 1 and 2, and removes impurities from water poured in or otherwise supplied to the funnel member 24.

As shown in FIG. 3, water, such as tap water, is poured in the funnel member 24, either directly into an open end 34 of the funnel member 24 with the lid 28 removed from the container 22, or through an opening (not shown) in the lid 28 while the lid is attached to the container. The funnel member 24 directs the water toward the filter cartridge 32 positioned at a bottom end 36 of the funnel member 24 as shown in FIG. 2. Filter media inside the filter cartridge 32 removes impurities and other substances from the water. The filtered water then moves through at least one hole at the bottom end of the filter cartridge into the bottom end of the funnel member 24, and then into the container 22 where it is stored and used for drinking water or other purposes. In the illustrated embodiment, the container 22 is a pitcher, but it is contemplated that the container may be any suitable container and may be any size container.

Referring now to FIGS. 4-17, an embodiment of the water filter cartridge 32 is shown and includes a filter housing 38 and a removable cover 40. The filter housing 38 has an integrally formed, cone-shaped wall 42 with a first generally curved portion 44 and a flat portion 46 where the curved portion and the flat portion angle downwardly to form a closed end 48. The flat portion 46 serves as an alignment guide when inserting the filter cartridge 32 in a correspondingly shaped receptacle 49 in the funnel member 24 as shown in FIG. 2. At the closed end 48, there is a hole 50 that allows filtered water to exit the filter cartridge 32. The opposing end 52 of the filter housing 38 is open and is sealed by the cover 40. Depending on the desired flow rate through the filter cartridge 32, the filter housing 38 may have one or more of the holes 50, where the holes may be any suitable size and shape. For example, increasing the number of the holes in the closed end 48 of the filter housing 38, causes the water to exit faster from the housing 38 and thereby causes the flow rate of the water to increase through the filter cartridge 32. In the same regard, the size of the holes also affects the flow rate of the water through the filter cartridge. For example, a hole or holes with a large diameter allow the filtered water to exit faster from the filter cartridge than a hole or holes with a smaller diameter thereby also increasing the flow rate of the water through the filter cartridge.

In the illustrated embodiment, the filter housing 38 is preferably made of a durable plastic material that is extruded or molded into the cone-shape described above. It should be appreciated that the filter housing 38 may have any suitable shape and may be made of any suitable material or combination of materials.

Figure 5:
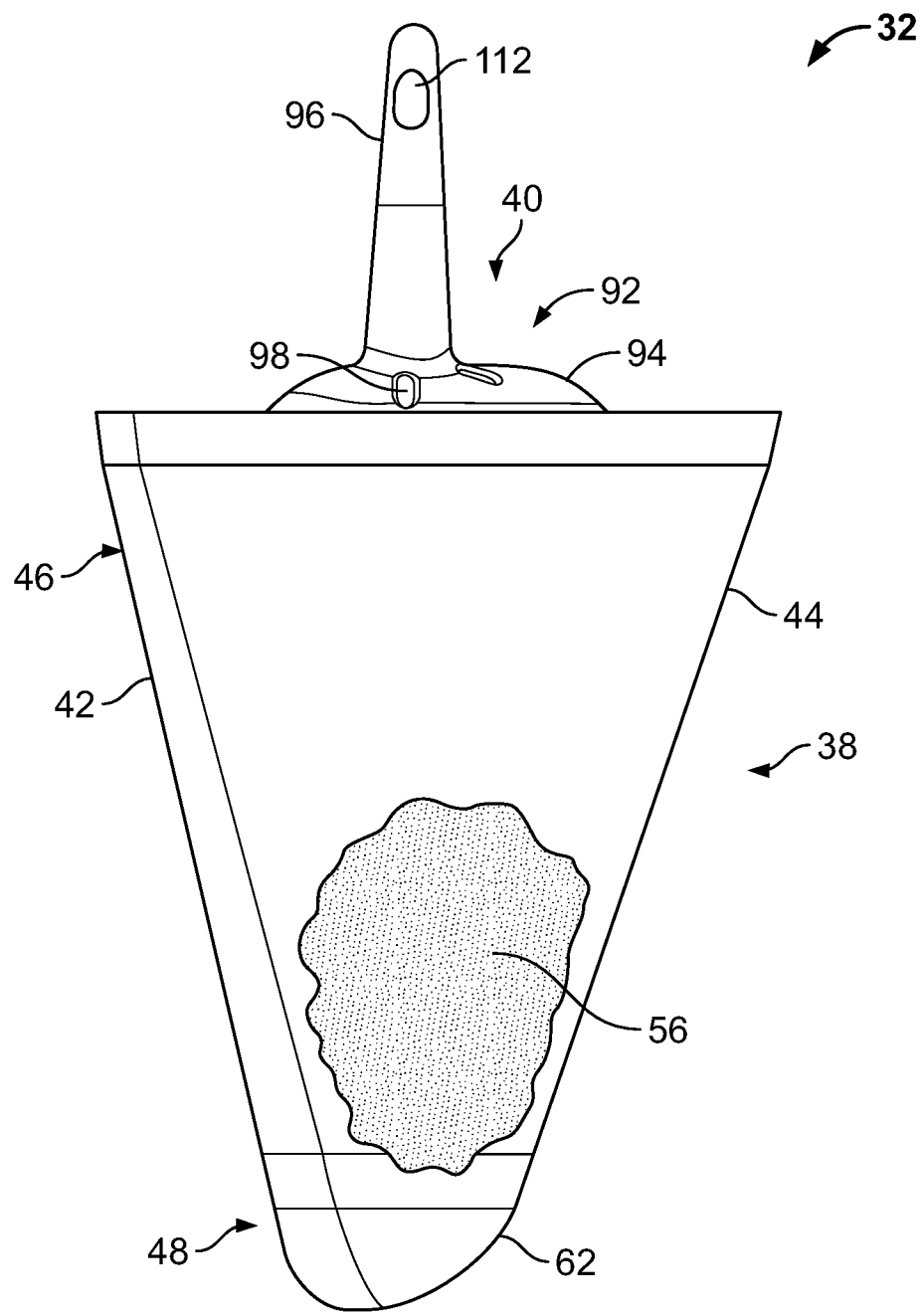
FIG. 5 is a fragmentary, side perspective view of the filter cartridge of FIG. 4 showing the filter media inside the filter cartridge.

A hollow interior space 54 is formed by the wall 42 and is configured to receive filter media 56. In the illustrated embodiment, granulated filter media 56 is inserted into the interior space 54 of the filter housing 38 as shown in FIG. 5. The granulated filter media 56 is made of a mixture of carbon and an ion exchange resin and removes 99.9% of the impurities from the water passing through the filter cartridge 32. Other filter media may be used depending on the desired impurities to be removed from the water and the desired qualities of the filtered water that exits the filter cartridge 32.

Figure 9A:
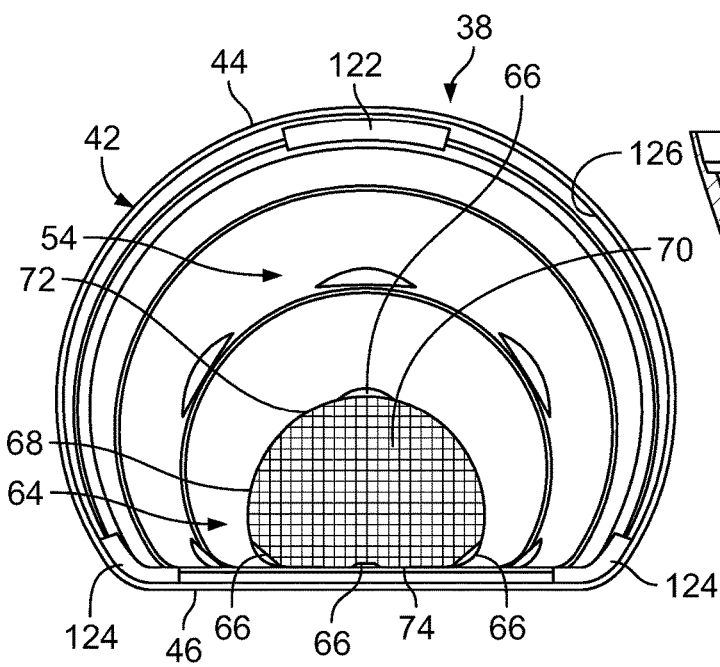
FIG. 9A is a top perspective view of the housing of the water filter cartridge of FIG. 8.
Figure 9B:
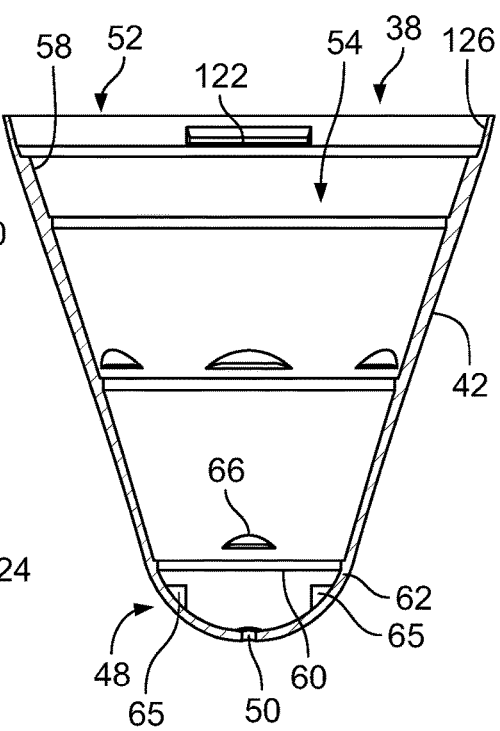
FIG. 9B is a cross-section view of the housing of FIG. 8 taken substantially along line 9B-9B in the direction generally indicated.

As shown in FIG. 9B, the inner surface 58 of the wall 42 includes a lip 60 that extends about the periphery of the wall near the bottom end 62 of the filter housing 38. The lip 60 forms a lower seat configured to support a screen assembly 64 that is inserted in the filter housing 38 and spaced a distance above the exit hole 50. The screen assembly 64 supports the filter media 56 while spacing the filter media a distance from the exit hole 50 to help prevent clogging of the hole 50 and help prevent the filter media from entering the filtered water stored in the container 22. Several tabs 66 extend or protrude from the inner surface 58 of the wall 42 and are spaced a distance from the lip 60 so that the screen assembly 64 fits between the lip 60 and the tabs 66 and is secured in place inside the filter housing 38. In the illustrated embodiment, four tabs 66 are spaced about the periphery of the wall 38. Alternatively, an upper lip or upper ridge (not shown) may be formed on the inner surface 58 of the wall 42 and extend about the periphery of the wall similar to the lip 60. It should be appreciated that one or more tabs 66 may be formed on the wall 42 to secure the screen assembly 64 in place in the filter housing 38. In addition to the tabs 66, the screen assembly 64 is supported by posts 65 as described below. The posts 65 are integrally formed with the wall 42 and extend toward the open end 52 of the filter housing 38.

Figure 10A:
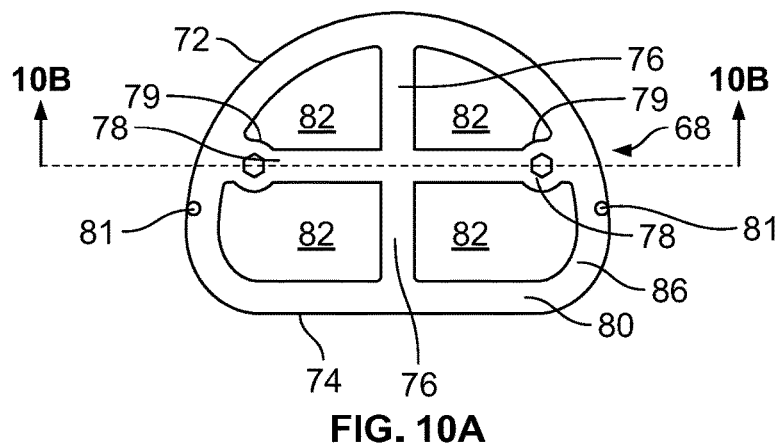
FIG. 10A is a top view of the filter plate of the filter screen member shown in FIG. 9A.
Figure 10B:
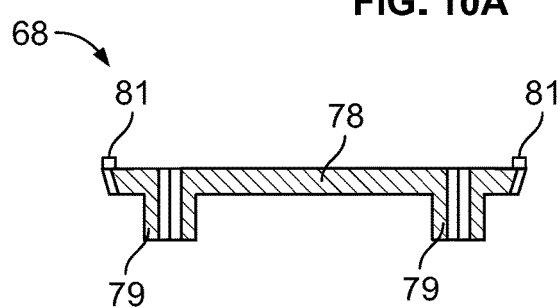
FIG. 10B is a cross-section view of the filter plate of FIG. 10A taken substantially along line 10B-10B in the direction generally indicated.
Figure 11:
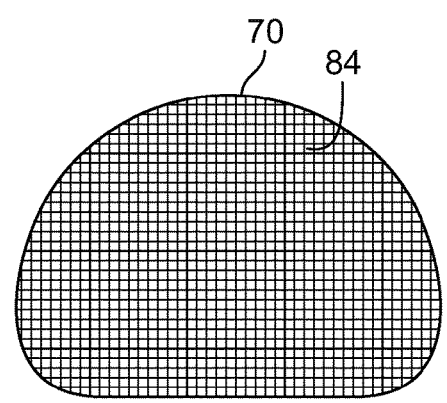
FIG. 11 is a top view of the screen of the filter screen member shown in FIG. 9A.
Figure 12:
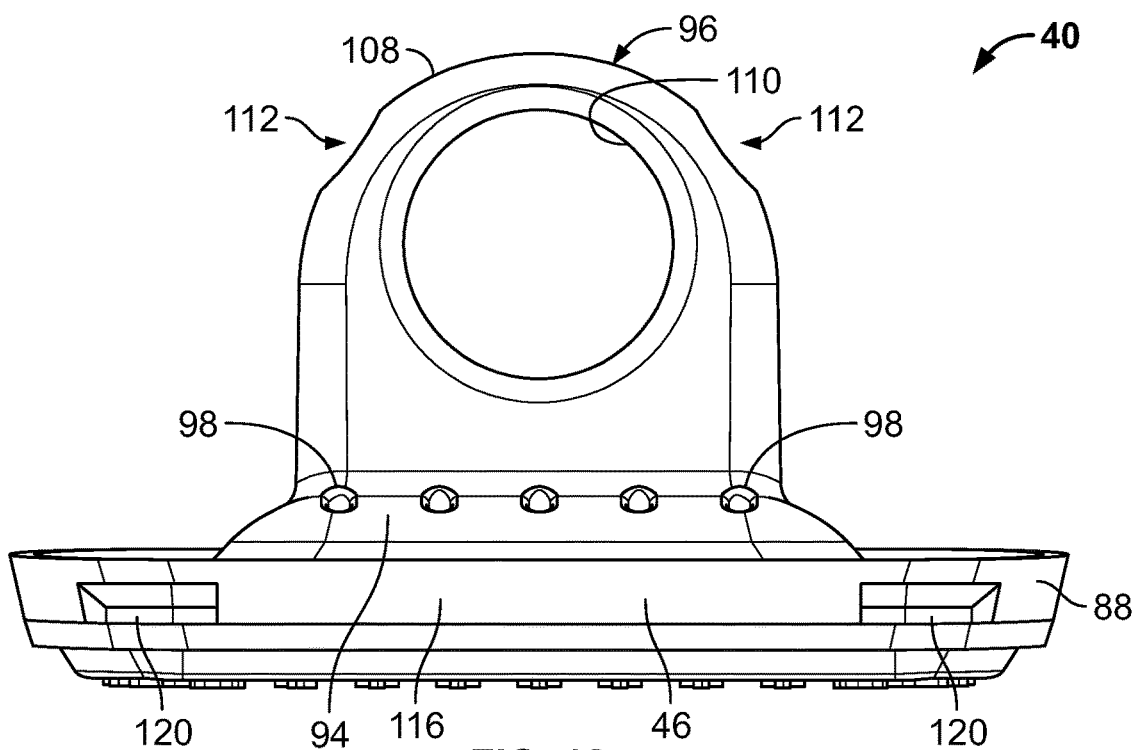
FIG. 12 is a front perspective view of the cover of the water filter cartridge of FIG. 8.
Figure 13:
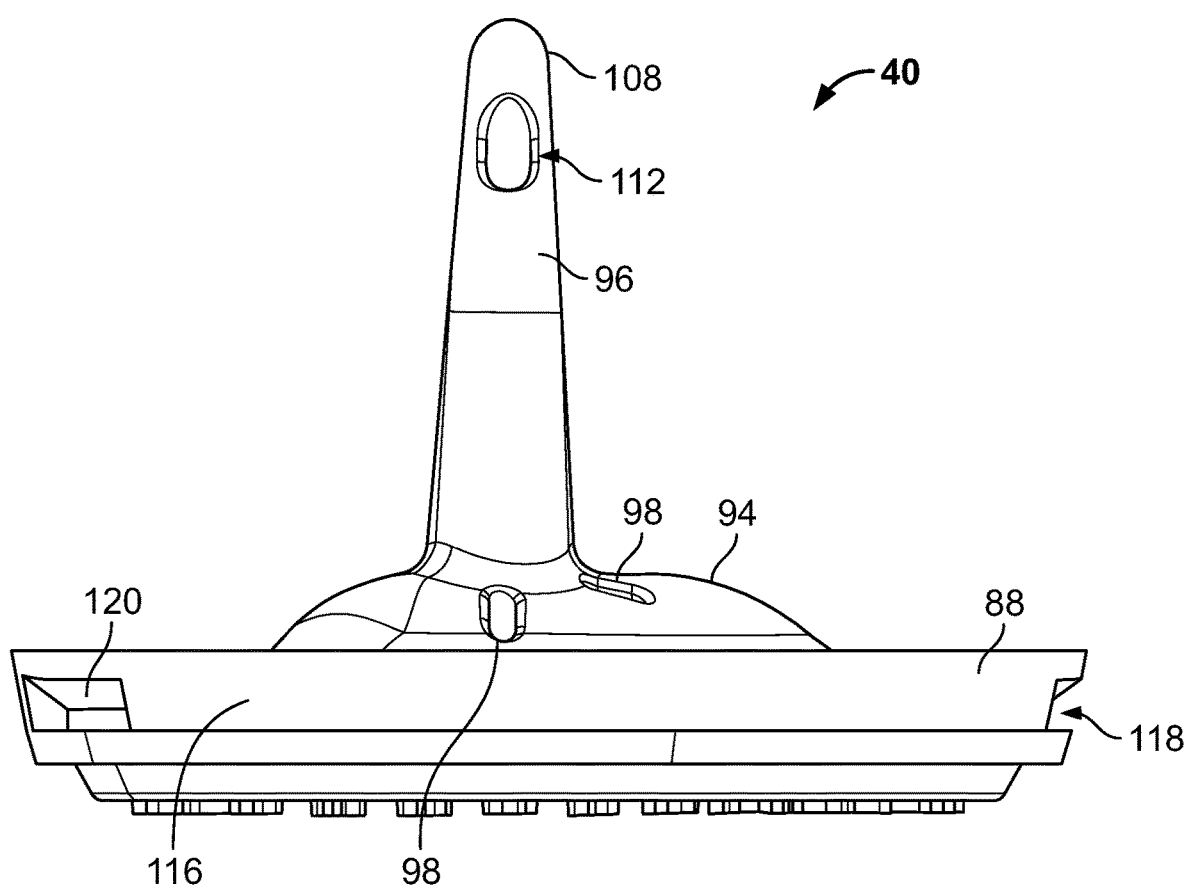
FIG. 13 is a right side perspective view of the cover of FIG. 12.
Figure 14:
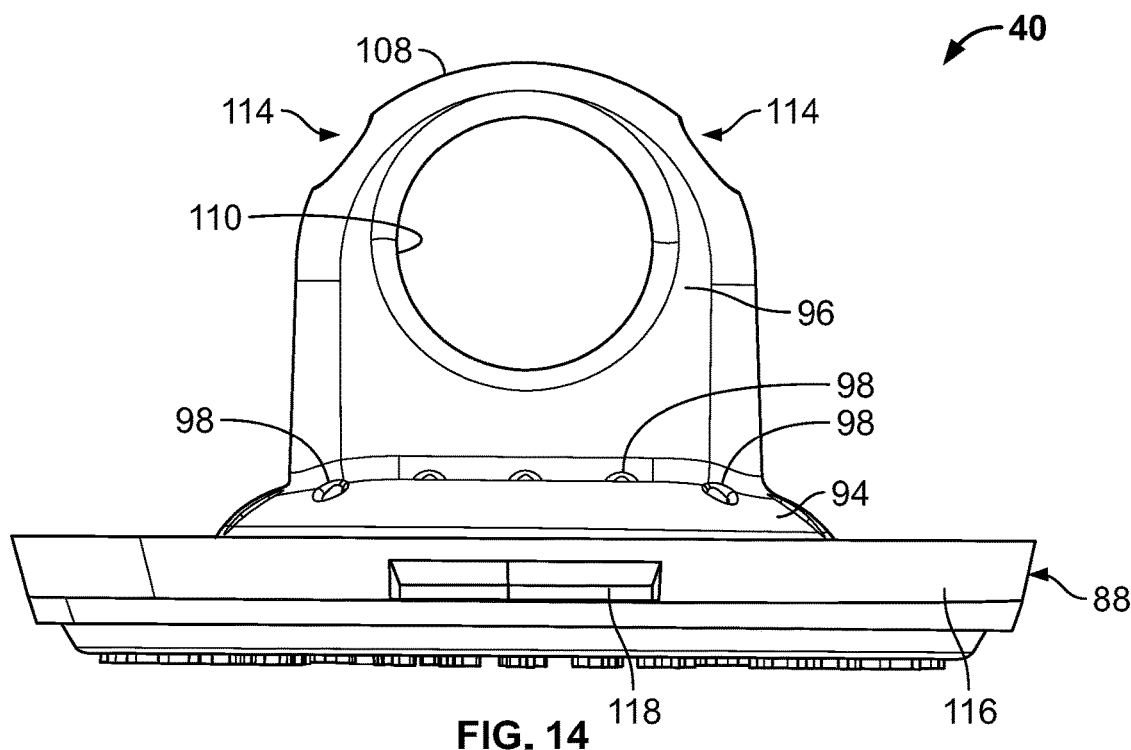
FIG. 14 is a rear perspective view of the cover of FIG. 12.
Figure 15:
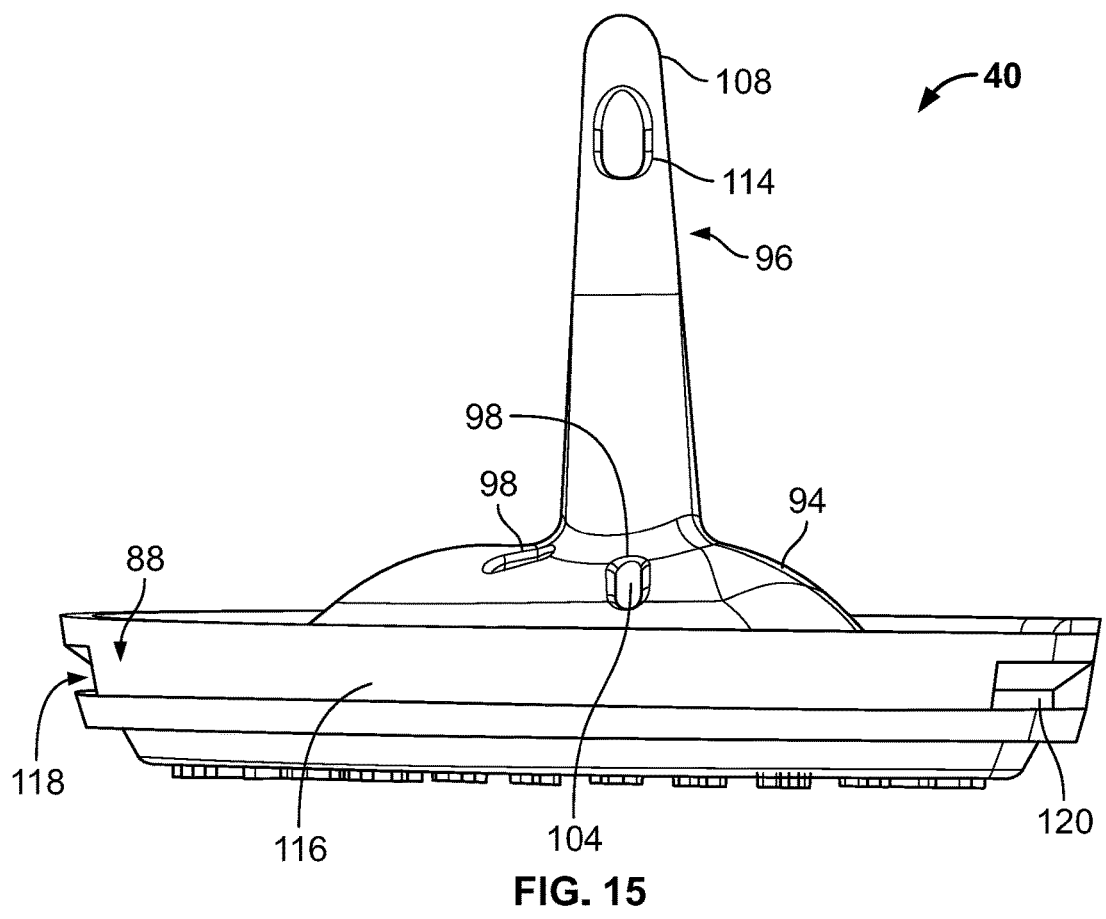
FIG. 15 is a left side perspective view of the cover of FIG. 12.

As shown in FIGS. 10A, 10B and 11, the screen assembly 64 includes a filter plate 68 and a screen 70. The filter plate 68 has a semi-circular shape with a curved side 72 and a flat side 74. A first support 76 extends between the flat side 74 and the curved side 72 of the plate 68, and a second support 78 extends across the curved side 72 of the plate 68 and is transverse to the first support 76. The first and second supports 76, 78 are integrally formed with an outer peripheral support 80 and combine to define a plurality of openings 82. Two connecting posts 77 extend from a top surface of the filter plate 68 and help secure the screen 70 to the filter plate and to help prevent the screen from sliding out from under the tabs 66. Additionally, a pair of generally cylindrical support legs 79 are integrally formed with the filter plate 68 and extend from a bottom surface of the filter plate. The screen 70 is attached to a surface of the filter plate 68 by engaging the screen with the connecting posts 77 and by applying an adhesive between the screen and the filter plate, or by other suitable attachment methods. In the illustrated embodiment, the screen 70 has a fine mesh with throughholes 84 that are small enough to prevent the filter media 56 from moving through the screen while allowing filtered water to pass through the screen and flow to the bottom end 62 of the filter housing 38 and out through the exit hole 50.

During assembly, the filter plate 68 is inserted into the interior space 54 of the filter housing 38 and placed on the lip 60. The screen assembly 64 is then pressed downwardly until the top surface 84 of the screen assembly moves past the tabs 66 and snaps into place. As additional support, the support legs 79 are seated on the corresponding posts 65 of the filter housing 38 when the screen assembly 64 is attached to the filter housing. If necessary, the screen assembly 64 is removable from the filter housing 38 by lifting upwardly on the filter plate 68 until the screen assembly 64 moves above the tabs 66. In this way, the screen assembly 64 is replaceable if it gets damaged or if a different size mesh screen is needed. Once the screen assembly 64 is in place within the filter housing 38, the filter media 56 is loosely filled in the interior space 54 of the filter housing 38 and sits on the top surface 86 of the screen assembly.

Figure 6:
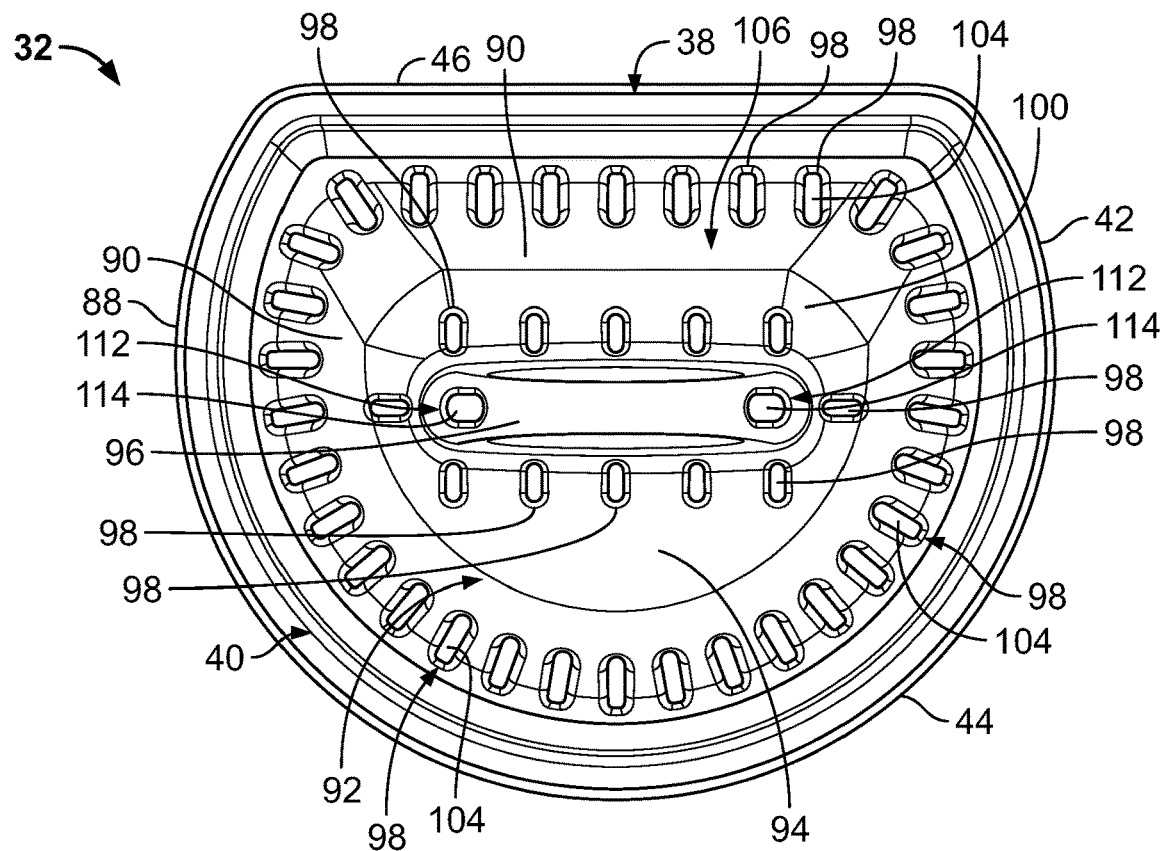
FIG. 6 is a top perspective view of the filter cartridge of FIG. 4.
Figure 7:
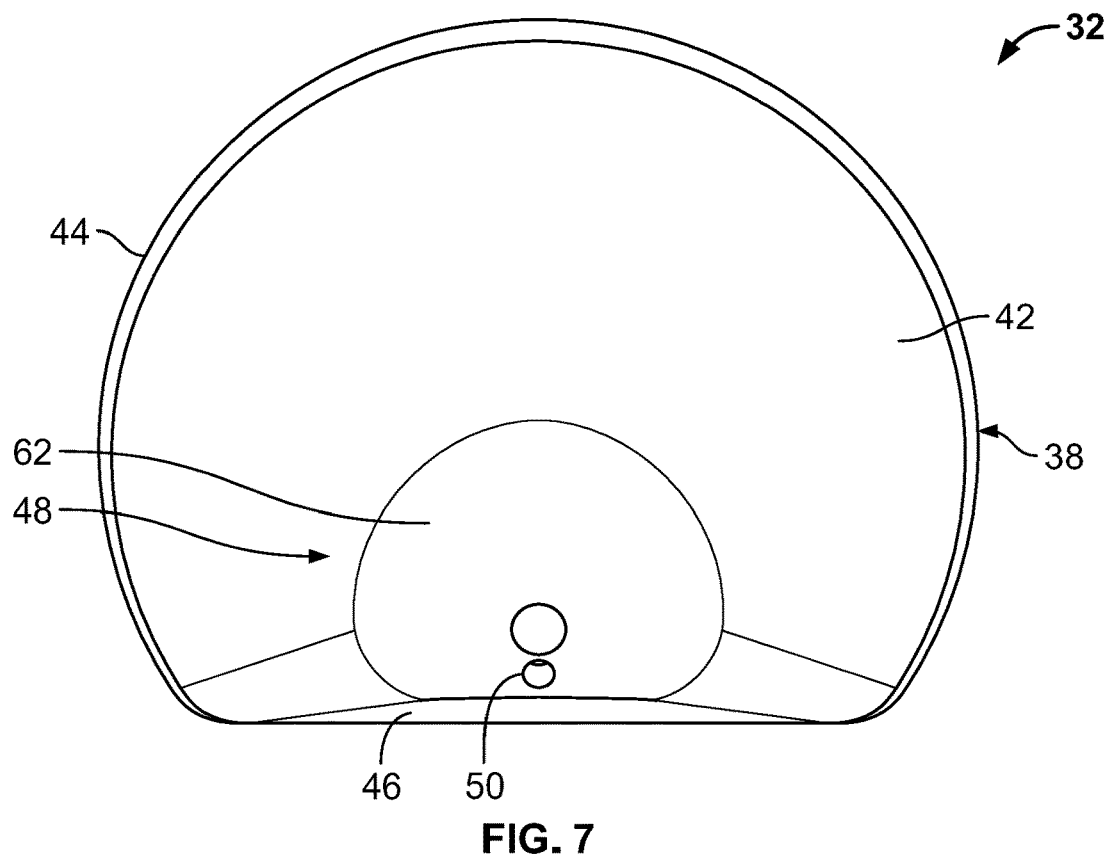
FIG. 7 is a bottom perspective view of the filter cartridge of FIG. 4.
Figure 8:
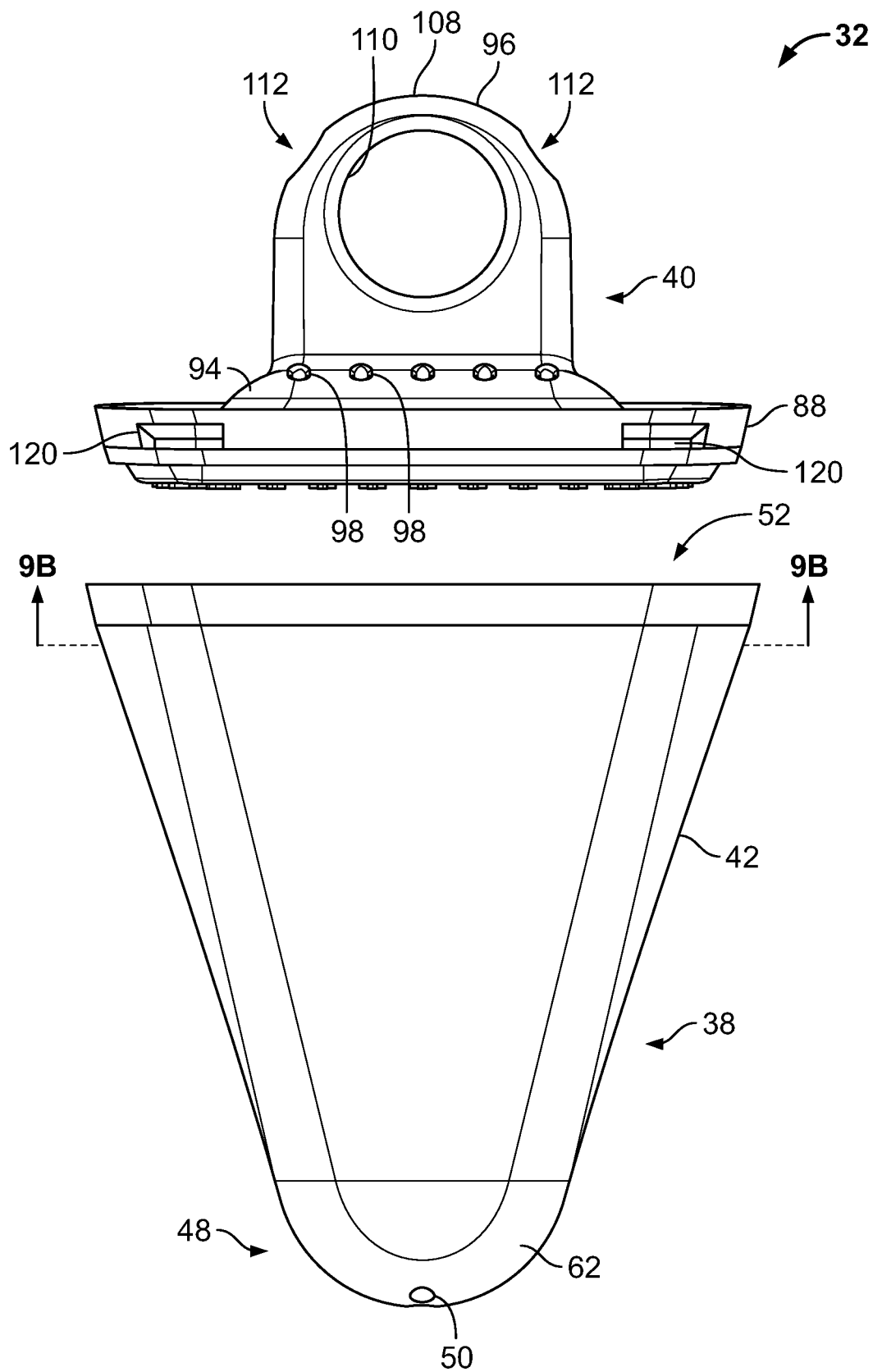
FIG. 8 is a front, exploded perspective view of the water filter cartridge of FIG. 4.
Figure 16:
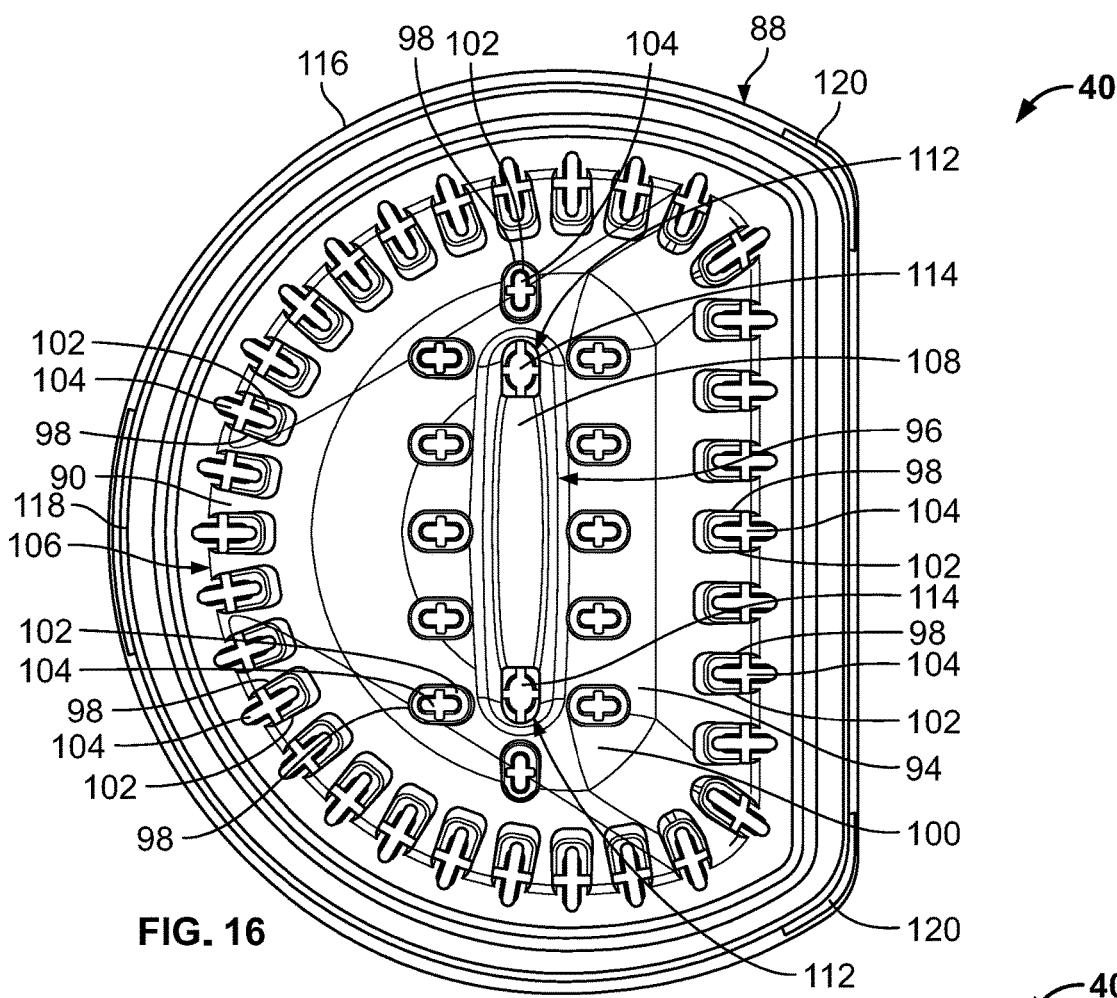
FIG. 16 is a top perspective view of the cover of FIG. 16.
Figure 17:
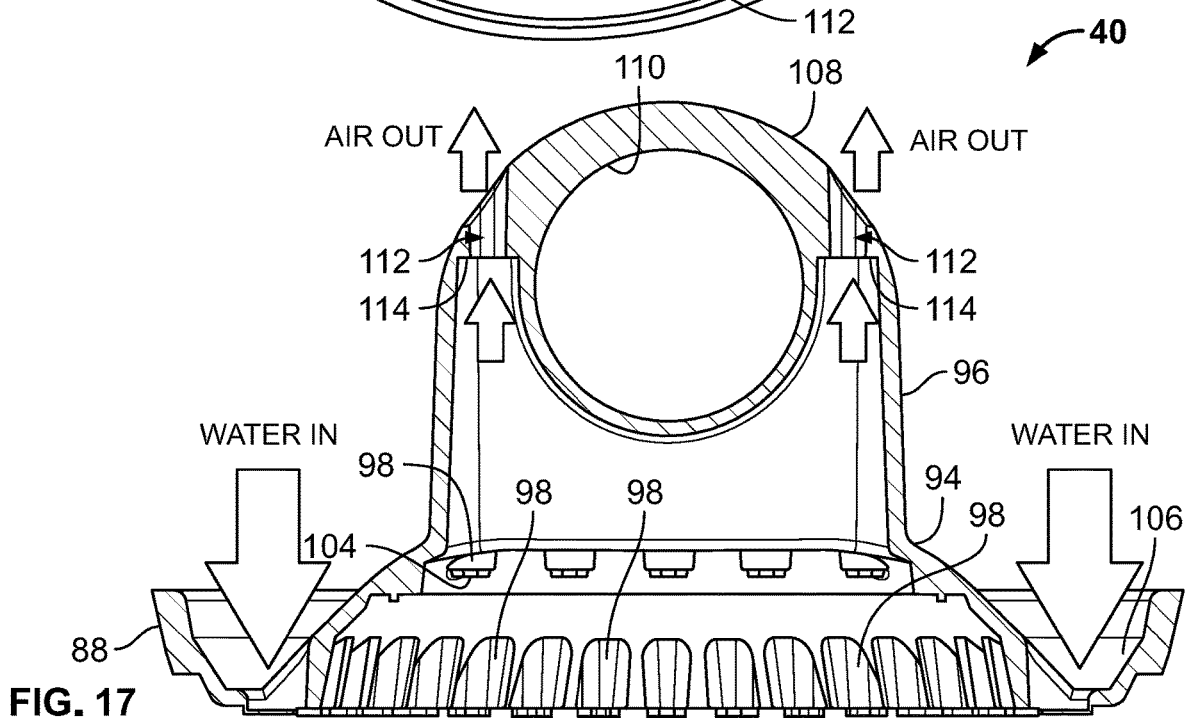
FIG. 17 is a schematic view of the cover of FIG. 12 showing the flow of water into the cover and the releasing of air out of the cover.

After the filter media 56 is filled in the interior space 54, the cover 40 is removably attached to the top of the filter housing 38. In the illustrated embodiment, the cover 40 is integrally molded with a durable plastic such as polyethylene, and includes a peripheral wall 88 having a generally semi-circular shape that corresponds with the top opening of the filter housing 38. As shown in FIGS. 16 and 17, the wall 88 slants inwardly toward a receiving surface 90. A central portion 92 of the cover 40 includes a semi-circular dome 94 and a handle 96 extending outwardly from the dome. A plurality of slotted holes 98 are formed in the bottom edge 100 of the dome 94. In the illustrated embodiment, the slotted holes 98 extend about the entire periphery of the bottom edge 100 of the dome 94. It should be appreciated that the slotted holes 98 may formed in any portion or portions of the bottom edge 100 of the dome 94. Each slotted hole 98 has a bottom end 102 with a slot member 104 that allows water to flow through the hole 98 and into the filter housing 38 while helping to prevent the filter media 56 from moving upwardly through the holes 98 and out of the filter cartridge 32. The top edge of the dome 94 also has the slotted holes 98 that perform the same function as the slotted holes at the bottom edge of the dome. As shown in FIGS. 6 and 17, the space between the wall 88 and the dome 94 forms a peripheral trough area 106 that funnels unfiltered water toward the slotted holes 98 at the bottom edge 100 of the dome to begin the filtering process.

The handle 96 extending from the dome 94 serves two functions. First, the handle 96 has a rounded top end 108 and a through-hole 110 that enables a user to insert one of their fingers into the through-hole to easily grab and hold the filter cartridge 32 during the insertion or removal of the filter cartridge to and from the container 22 or other suitable container. The through-hole 110 may be any suitable size and shape and is configured to accommodate different sized fingers. Second, the handle 96 includes two opposing slotted vent holes 112 that extend from the dome 94 to the top end 108 of the handle 96. Each vent hole 112 has a slot member 114 that enables air to move out of the vent holes while helping to prevent the filter media 56 from exiting the holes. As explained in more detail below, the slotted vent holes 110 in the handle 96 help to effectively remove air that moves toward the cover 40 during the water filtration process.

To attach the cover 40 to the filter housing 38, the outer surface 116 of the wall 88 includes a center groove 118 and a pair of corner grooves 120. The center groove 118 and the corner grooves 120 on the cover 40 correspond with a center tab 122 and two corner tabs 124 extending from the inner surface 126 of the filter housing 38. The cover 40 is secured to the filter housing 38 by aligning the center groove 118 with the m center tab 122 and aligning the corner grooves 120 with the corner tabs 124 and then pressing the cover 40 and the filter housing 38 together until the center tab 122 and corner tabs 124 move or snap into the center groove 118 and corner grooves 120 of the cover.

To remove the cover 40 from the filter housing 38, a user grabs the handle 96 and pulls the cover 40 away from the filter housing 38 so that that the center tab 122 and the corner tabs 124 move outwardly from the center groove 118 and the corner grooves 120. It should be appreciated that the filter housing 38 may have any suitable number of tabs and the cover 40 may have any suitable number of corresponding grooves for securing the cover to the filter housing. In the illustrated embodiment, the center tab 122 and the corner tabs 124 on the filter housing 38, and the center groove 118 and the corner grooves 120 on the cover 40 are respectively positioned on the filter housing 38 and the cover 40 so that the top surface of the wall 88 of the cover is generally flush with the end 52 of the filter housing 38 when the cover 40 is secured to the filter housing 38.

In operation, water, such as tap water, is directed into the funnel member 24 of the container 22 by removing the lid 28 from the container 22 and placing the container under a water faucet or by pouring or otherwise directing water into the funnel member. The unfiltered water moves downwardly in the funnel member 24 and into the slotted holes 98 in the cover 40 of the filter cartridge 32. As the water moves through the slotted holes 98 in the cover 40, excess water fills the funnel member 24. The water flows into the filter housing 38 and through the filter media 56 and then into the 48 end of the filter housing. Air within the filter media 56 and the filter housing 38, moves toward the top of the filter housing 38 as the water fills the interior space 54. In conventional filter cartridges, some of this air would be released through holes in the cover. However, some of the air in the conventional filter cartridges also remains at top of the filter housing and gets trapped under the cover, and as a result, inhibits the flow of the water through the filter cartridge. As such, this collection of air under the cover causes inconsistent flow rates and slow flow rates through the conventional filter cartridges.

To overcome this problem, the slotted vent holes 112 in the handle 96 of the present filter cartridge 32 help to release the trapped air by creating a release point that is higher than the top surface of the cover 40. In this way, a significant amount of the air that moves to the top of the filter housing 38 during the filtering process continues to move upwardly into the vent holes and is released through the vent holes 112. Releasing a significant amount of the air that builds up between the filter housing and the cover enables the water to flow more consistently through the filter cartridge 32 and enhances the flow rate of the water through the filter cartridge.

After the water passes through the filter media 56 inside the filter cartridge 32, the filtered water exits the filter cartridge through the hole 50 at the bottom end 48 of the filter cartridge and into the container 22. The filtered water is collected and stored in the container 22 and used for drinking water or other purposes.

While a particular embodiment of the filter cartridge 32 for a water filter system 20 has been described herein, it will be appreciated by those skilled in the art that changes and modifications may be made thereto without departing from the invention in its broader aspects and as set forth in the following claims.

What is claimed is:

1. A gravity flow filter cartridge comprising:
a filter housing 28 having an open upper end 52 and an integrally formed, cone-shaped wall 42 with a first generally semi-circular portion 44 and a flat portion 46 where the generally semi-circular portion and the flat portion angle downwardly to form a closed end 48, the cone-shaped wall 42 defining a hollow interior space 54 for containing filter media 56, at least one hole 50 at the closed end 48 of the filter housing 28 that allows filtered water to exit the hollow interior space; and
a removable cover 40 having a generally semi-circular shape and a straight portion, the removable cover being capable of sealingly engaging the open upper end 52 of the filter housing, the removable cover having a central portion 92 including a semi-circular dome 94 and a hollow handle 96 extending from the dome orthogonally, relative to a plane of the removable cover and defining a through-hole 110 that enables a user to insert a finger into the through-hole to manipulate the filter cartridge 32 during insertion or removal of the gravity flow filter cartridge to and from a container 22, the hollow handle 96 includes at least one vent hole 112 through a top end 108 of the handle 96 to enable air to exit the at least one vent hole to remove air that moves toward the removable cover 40 during filtration, a plurality of holes 98 are formed in a bottom edge 100 of the dome 94 to allow water to flow by gravity through the holes 98 and into the hollow interior space 54, the hollow handle placing the at least one vent hole 112 in fluid communication with the hollow interior space 54.

2. The gravity flow filter cartridge of claim 1, wherein the filter media is granular and is disposed within the hollow interior space.

3. The gravity flow filter cartridge of claim 2, wherein the granular media filter media includes carbon.

4. The gravity flow filter cartridge of claim 2, wherein the granular media filter media includes an ion exchange resin.

5. The gravity flow filter cartridge of claim 2, wherein the granular media filter media includes a mixture of carbon and an ion exchange resin.

6. The gravity flow filter cartridge of claim 1, wherein the holes 98 are slots.

7. The gravity flow filter cartridge of claim 1, wherein the at least one vent hole is a slot.

* * * * *